(12) United States Patent
Kaltenbach

(10) Patent No.: US 9,334,930 B2
(45) Date of Patent: May 10, 2016

(54) TRANSMISSION FOR A MOTOR VEHICLE

(71) Applicant: ZF Friedrichshafen AG, Friedrichshafen (DE)

(72) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/260,864

(22) Filed: Apr. 24, 2014

(65) Prior Publication Data

US 2014/0364271 A1 Dec. 11, 2014

(30) Foreign Application Priority Data

Jun. 6, 2013 (DE) .......................... 10 2013 210 493

(51) Int. Cl.
| | |
|---|---|
| *F16H 3/66* | (2006.01) |
| *F16H 3/00* | (2006.01) |
| *F16H 3/64* | (2006.01) |
| *F16H 3/44* | (2006.01) |

(52) U.S. Cl.
CPC ............... *F16H 3/66* (2013.01); *F16H 3/006* (2013.01); *F16H 3/64* (2013.01); *F16H 2003/442* (2013.01); *F16H 2200/0056* (2013.01); *F16H 2200/0078* (2013.01); *F16H 2200/201* (2013.01); *F16H 2200/2007* (2013.01); *F16H 2200/2012* (2013.01); *F16H 2200/2015* (2013.01); *F16H 2200/2017* (2013.01); *F16H 2200/2046* (2013.01); *F16H 2200/2051* (2013.01); *F16H 2200/2064* (2013.01); *F16H 2200/2094* (2013.01)

(58) Field of Classification Search
None
See application file for complete search history.

(56) References Cited

U.S. PATENT DOCUMENTS

| | | | |
|---|---|---|---|
| 7,637,840 B2 | 12/2009 | Ziemer | |
| 2005/0176550 A1* | 8/2005 | Bucknor et al. | 475/275 |
| 2006/0148605 A1* | 7/2006 | Raghavan et al. | 475/5 |
| 2009/0093332 A1* | 4/2009 | Bucknor et al. | 475/5 |
| 2011/0124462 A1* | 5/2011 | Meyer et al. | 475/271 |

FOREIGN PATENT DOCUMENTS

| | | |
|---|---|---|
| DE | 10 2004 014 082 A1 | 10/2005 |
| DE | 102013202045 A1 | 8/2014 |
| WO | 2014121957 A1 | 8/2014 |

OTHER PUBLICATIONS

German Search Report issued in corresponding German Patent Application No. 10 2013 210 493.6 mailed May 18, 2015.

* cited by examiner

*Primary Examiner* — Justin Holmes
*Assistant Examiner* — Timothy M Hannon
(74) *Attorney, Agent, or Firm* — Davis & Bujold, P.L.L.C.; Michael J. Bujold

(57) ABSTRACT

A transmission having input and output shafts, shifting elements and planetary gearsets including sun and ring gears, planetary gearwheels and a carrier. The carrier of the first gearset is fixed to the input. The ring gear of the second gearset can be connected by a first shifting element to the housing and by a second shifting element to the carrier of the second gearset. The ring gear of the first gearset is fixed to the sun gear of the second gearset. The sun gear of the first gearset can be connected by a third shifting element to the housing, or is fixed to the sun gear of the second gearset and the ring gear of the first gearset can be connected by a third shifting element fixed to the housing. The shifting elements are arranged within the housing and accessible from outside the housing.

19 Claims, 26 Drawing Sheets

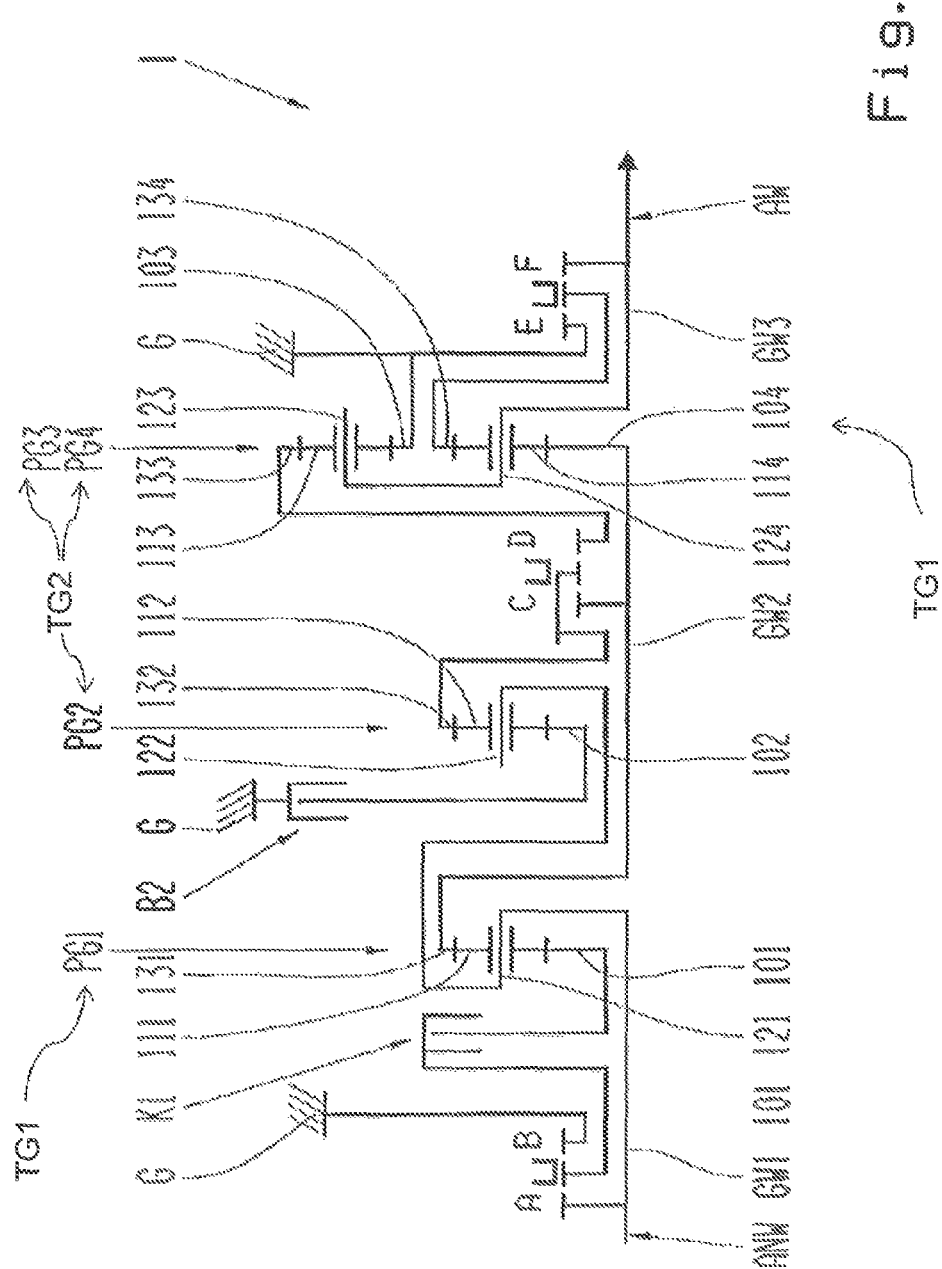

Fig. 1c

| GEAR | K1 | B2 | A | B | C | D | E | F | i | phi |
|---|---|---|---|---|---|---|---|---|---|---|
| V1 | x |   | x |   |   |   | x |   | 2.88 |   |
| V2 |   | x |   | x |   |   | x |   | 2.21 | 1.30 |
| V3 | x | x |   |   |   |   | x |   | 1.69 | 1.30 |
| V4 |   | x |   |   |   | x |   |   | 1.30 | 1.30 |
| V5 | x |   | x |   | x |   |   |   | 1.00 | 1.30 |
| V6 |   | x |   |   |   |   |   | x | 0.77 | 1.30 |
| V7 | x |   |   | x |   |   |   | x | 0.59 | 1.30 |

Fig. 1b

|  | i0 | i_PG |
|---|---|---|
| PG1 | -1.43 | 0.59 |
| PG2 | -3.3 | 0.77 |
| PG3 | -1.43 | 1.70 |
| PG4 | -1.88 | 2.88 |

| GEAR | K1 | B2 | A | B | C | D | E | F | L | H | R | i | phi |
|---|---|---|---|---|---|---|---|---|---|---|---|---|---|
| V1 | x |  | x |  |  |  | x |  | x |  |  | 17.79 | 1.30 |
| V2 |  | x |  |  |  |  | x |  | x |  |  | 13.65 | 1.30 |
| V3 | x |  |  | x |  |  | x |  | x |  |  | 10.47 | 1.30 |
| V4 |  | x |  | x |  |  |  | x | x |  |  | 8.05 | 1.30 |
| V5 | x |  | x |  |  |  |  | x | x |  |  | 6.19 | 1.30 |
| V6 |  | x |  |  | x |  | x | x |  |  |  | 4.74 | 1.30 |
| V7 | x |  |  | x |  |  | x | x |  |  |  | 3.63 | 1.30 |
| V8 |  | x |  |  |  | x |  |  |  | x |  | 2.88 | 1.30 |
| V9 | x |  | x |  |  |  |  |  |  | x |  | 2.21 | 1.30 |
| V10 |  | x |  | x |  |  |  |  |  | x |  | 1.69 | 1.30 |
| V11 | x |  |  |  | x |  |  |  |  | x |  | 1.30 | 1.30 |
| V12 |  | x |  |  |  |  |  | x |  | x |  | 1.00 | 1.30 |
| V13 | x |  |  | x |  |  |  | x |  |  |  | 0.77 | 1.30 |
| V14 |  | x |  |  |  | x |  |  |  |  |  | 0.59 | 1.30 |
| R1 | x |  | x |  |  |  | x | x |  |  | x | −20.97 | 1.30 |
| R2 |  | x |  | x |  |  | x | x |  |  | x | −16.09 | 1.30 |
| R3 | x |  |  |  | x |  | x | x |  |  | x | −12.34 | 1.30 |
| R4 |  | x |  | x |  |  |  | x |  |  | x | −9.49 | 1.30 |
| R5 | x |  | x |  |  |  |  | x |  |  | x | −7.28 | 1.30 |
| R6 |  | x |  |  |  | x |  | x |  |  | x | −5.59 | 1.30 |
| R7 | x |  |  | x |  |  |  | x |  |  | x | −4.28 | 1.30 |

Fig. 2c

| | i0 | i_PG | Low | R |
|---|---|---|---|---|
| PG1 | −1.43 | 0.59 |  |  |
| PG2 | −3.3 | 0.77 |  |  |
| PG3 | −1.43 | 1.70 |  |  |
| PG4 | −1.88 | 2.88 |  |  |
| PG5 | −2.8 |  | 6.18 | −7.28 |
| PG6 | −1.60 |  |  |  |

Fig. 2b

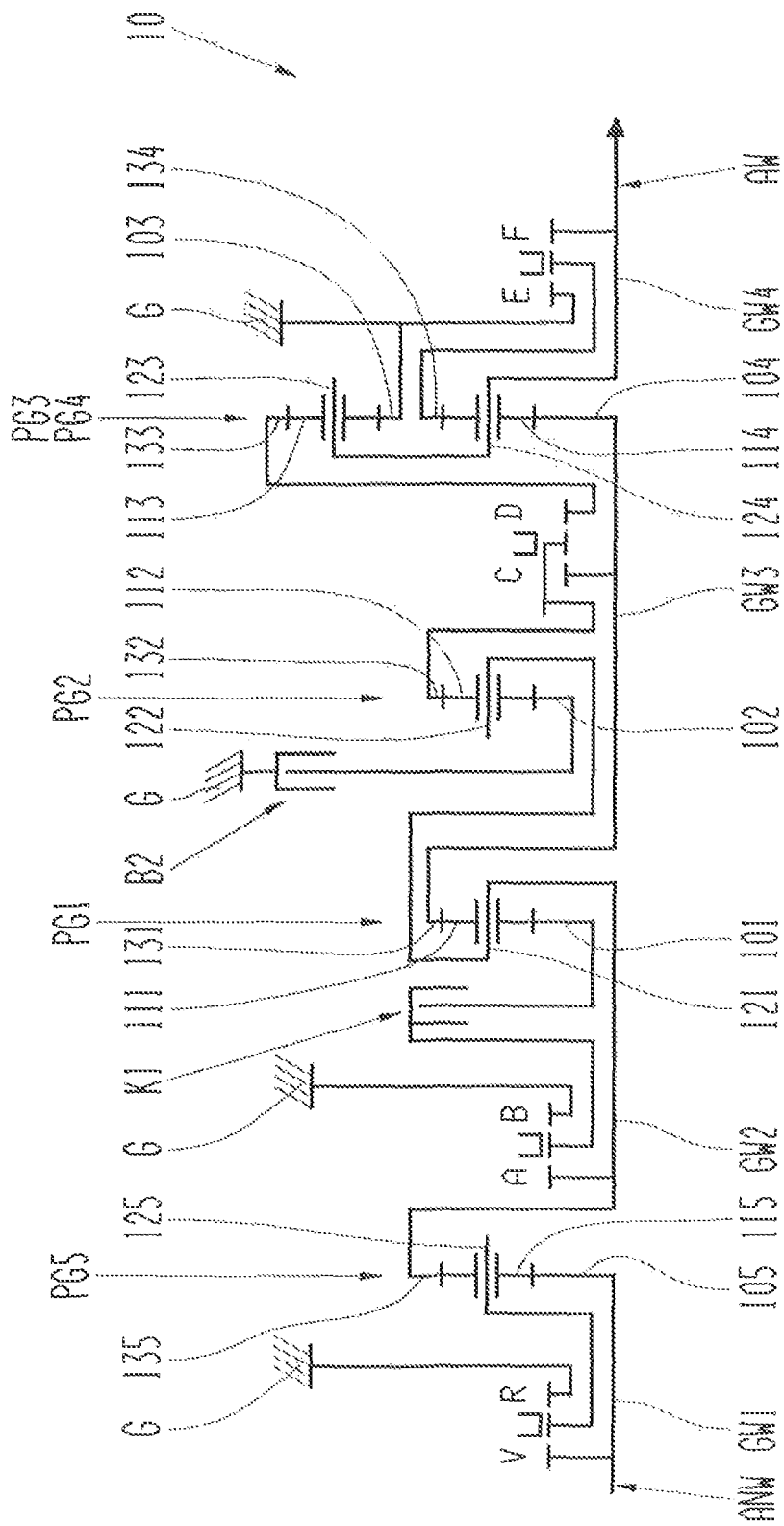

| GEAR | K1 | B2 | A | B | C | D | E | F | i | phi |
|------|----|----|---|---|---|---|---|---|------|------|
| V1 | x |   | x |   |   |   | x |   | 2.88 |      |
| V2 |   | x |   |   | x |   | x |   | 2.21 | 1.30 |
| V3 | x |   |   | x |   |   | x |   | 1.69 | 1.30 |
| V4 |   | x |   |   |   | x |   |   | 1.30 | 1.30 |
| V5 | x |   | x |   |   |   |   | x | 1.00 | 1.30 |
| V6 |   | x |   |   | x |   |   | x | 0.77 | 1.30 |
| V7 | x |   |   | x |   |   |   | x | 0.59 | 1.30 |

Fig. 5b

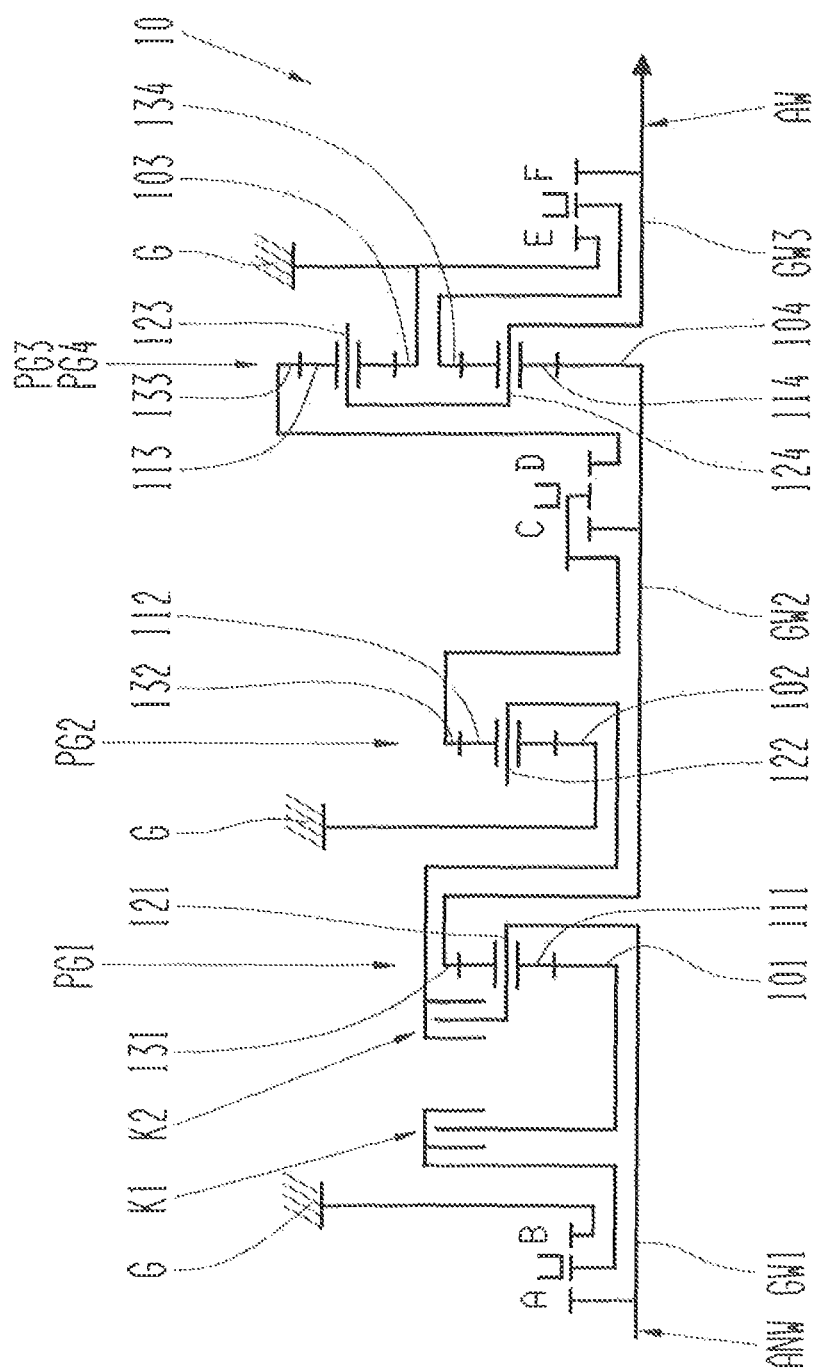

| GEAR | A | B | C | D | E | F | i | phi |
|---|---|---|---|---|---|---|---|---|
| V1 | x | | | | x | | 2.88 | |
| V2 | | | x | | x | | 2.21 | 1.30 |
| V3 | | x | | | x | | 1.69 | 1.30 |
| V4 | | | | x | | | 1.30 | 1.30 |
| V5 | x | | x | | | x | 1.00 | 1.30 |
| V6 | | | | | | x | 0.77 | 1.30 |
| V7 | | x | | | | x | 0.59 | 1.30 |

Fig. 7c

| | i0 | i_PG |
|---|---|---|
| PG1 | -1.43 | 0.59 |
| PG2 | -3.3 | 0.77 |
| PG3 | -1.43 | 1.70 |
| PG4 | -1.88 | 2.88 |

Fig. 7b

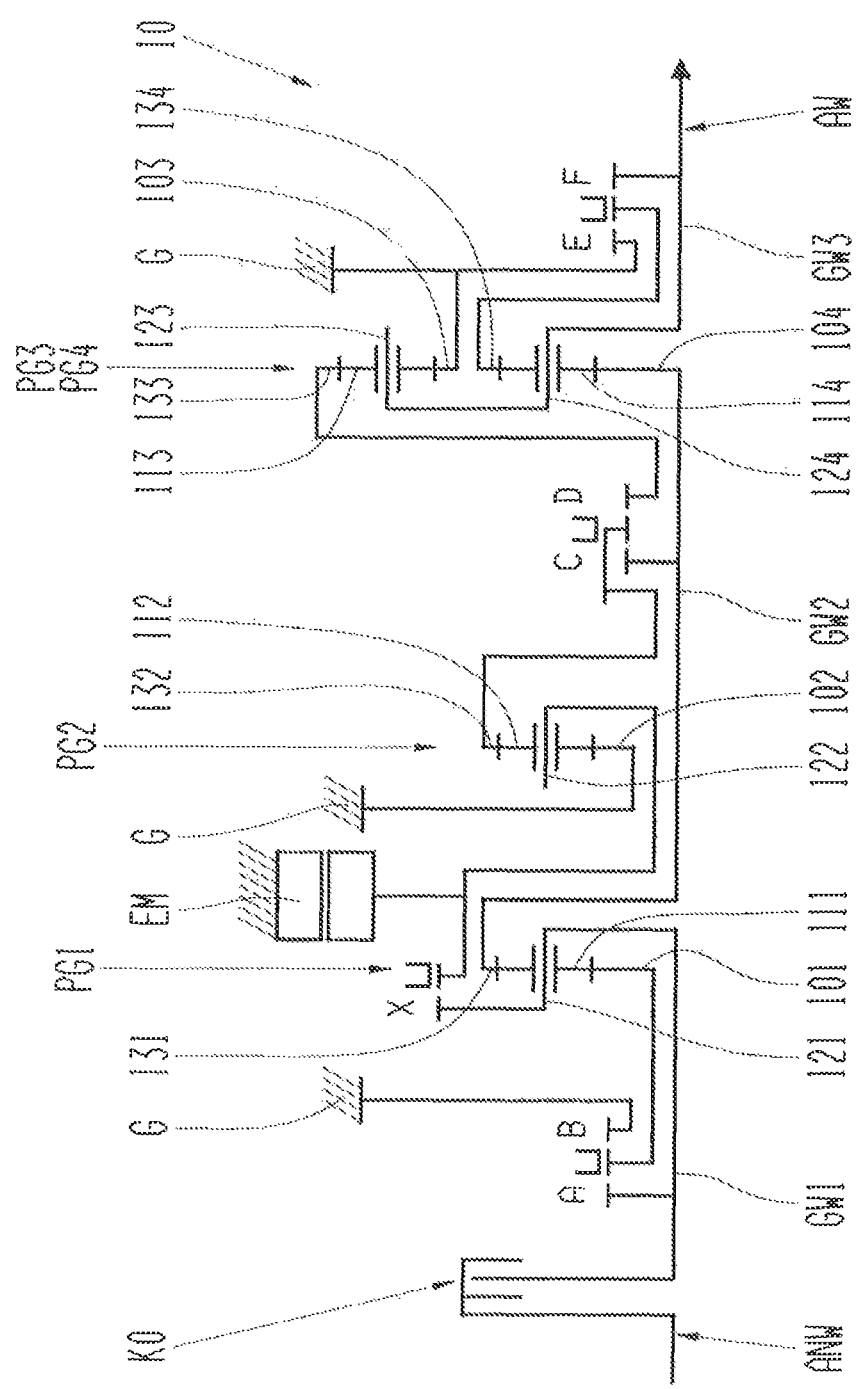

| GEAR | X | A | B | C | D | E | F | i | phi |
|---|---|---|---|---|---|---|---|---|---|
| V1 |  | x |  |  |  | x |  | 2.88 |  |
| V2 | x |  |  | x |  | x |  | 2.21 | 1.30 |
| V3 | x |  | x |  |  | x |  | 1.69 | 1.30 |
| V4 |  | x |  |  | x |  |  | 1.30 | 1.30 |
| V5 | x |  |  | x |  |  | x | 1.00 | 1.30 |
| V6 |  |  |  |  |  |  | x | 0.77 | 1.30 |
| V7 |  |  | x |  |  |  | x | 0.59 | 1.30 |

Fig. 8c

| | i0 | i_PG |
|---|---|---|
| PG1 | -1.43 | 0.59 |
| PG2 | -3.3 | 0.77 |
| PG3 | -1.43 | 1.70 |
| PG4 | -1.88 | 2.88 |

Fig. 8b

| GEAR | K1 | B2 | A | B | C | D | E | F | i | phi |
|------|----|----|---|---|---|---|---|---|------|------|
| V1   | x  |    | x |   |   |   |   |   | 2.88 |      |
| V2   |    | x  |   |   | x |   | x |   | 2.21 | 1.30 |
| V3   | x  |    |   | x |   |   | x |   | 1.69 | 1.30 |
| V4   |    | x  |   |   |   | x | x |   | 1.30 | 1.30 |
| V5   | x  |    | x |   |   |   |   | x | 1.00 | 1.30 |
| V6   |    | x  |   |   | x |   |   | x | 0.77 | 1.30 |
| V7   |    |    |   | x |   |   |   | x | 0.59 | 1.30 |

Fig. 9c

|     | i0    | i_PG |
|-----|-------|------|
| PG1 | -1.43 | 0.59 |
| PG2 | -3.3  | 0.77 |
| PG3 | -3.3  | 1.30 |
| PG4 | -1.88 | 2.88 |

Fig. 9b

| GEAR | K1 | K2 | A | B | C | D | E | F | Y | i | phi |
|------|----|----|---|---|---|---|---|---|---|------|------|
| V1   |    | x  |   |   |   |   | x |   | x | 3.8  |      |
| V2   | x  |    | x |   |   |   | x |   |   | 2.88 | 1.30 |
| V3   | x  | x  |   |   |   |   | x |   |   | 2.21 | 1.30 |
| V4   | x  |    |   | x |   |   | x |   |   | 1.69 | 1.30 |
| V5   |    | x  |   |   |   | x |   |   |   | 1.30 | 1.30 |
| V6   | x  |    | x |   |   |   |   | x |   | 1.00 | 1.30 |
| V7   |    | x  |   |   | x |   |   | x |   | 0.77 | 1.30 |
| V8   | x  |    |   | x |   |   |   | x |   | 0.59 | 1.30 |

Fig. 10c

| | i0 | i_PG |
|---|------|------|
| PG1 | -1.43 | 0.59 |
| PG2 | -3.3  | 0.77 |
| PG3 | -3.3  | 1.30 |
| PG4 | -1.88 | 2.88 |

Fig. 10b

| GEAR | K1 | K2 | A | B | C | D | E | F | Y | H | i | phi |
|---|---|---|---|---|---|---|---|---|---|---|---|---|
| V1 | x |   |   |   | x |   | x |   | x |   | 3.7 |   |
| V2 |   | x | x |   |   |   | x |   |   |   | 2.88 | 1.29 |
| V3 | x |   |   | x |   |   | x |   |   | x | 2.19 | 1.32 |
| V4 | x |   |   |   |   |   | x |   |   |   | 1.69 | 1.29 |
| V5 |   | x |   |   |   | x |   |   | x |   | 1.29 | 1.31 |
| V6 | x |   | x |   |   |   |   | x |   |   | 1.00 | 1.29 |
| V7 |   | x |   |   |   | x |   |   |   | x | 0.76 | 1.32 |
| V8 |   |   |   | x |   |   |   | x |   |   | 0.59 | 1.29 |

Fig. 11c

|  | i0 |
|---|---|
| PG1 | -1.42 |
| PG2 | -1.42 |
| PG3 | -3.15 |
| PG4 | -1.88 |

Fig. 11b

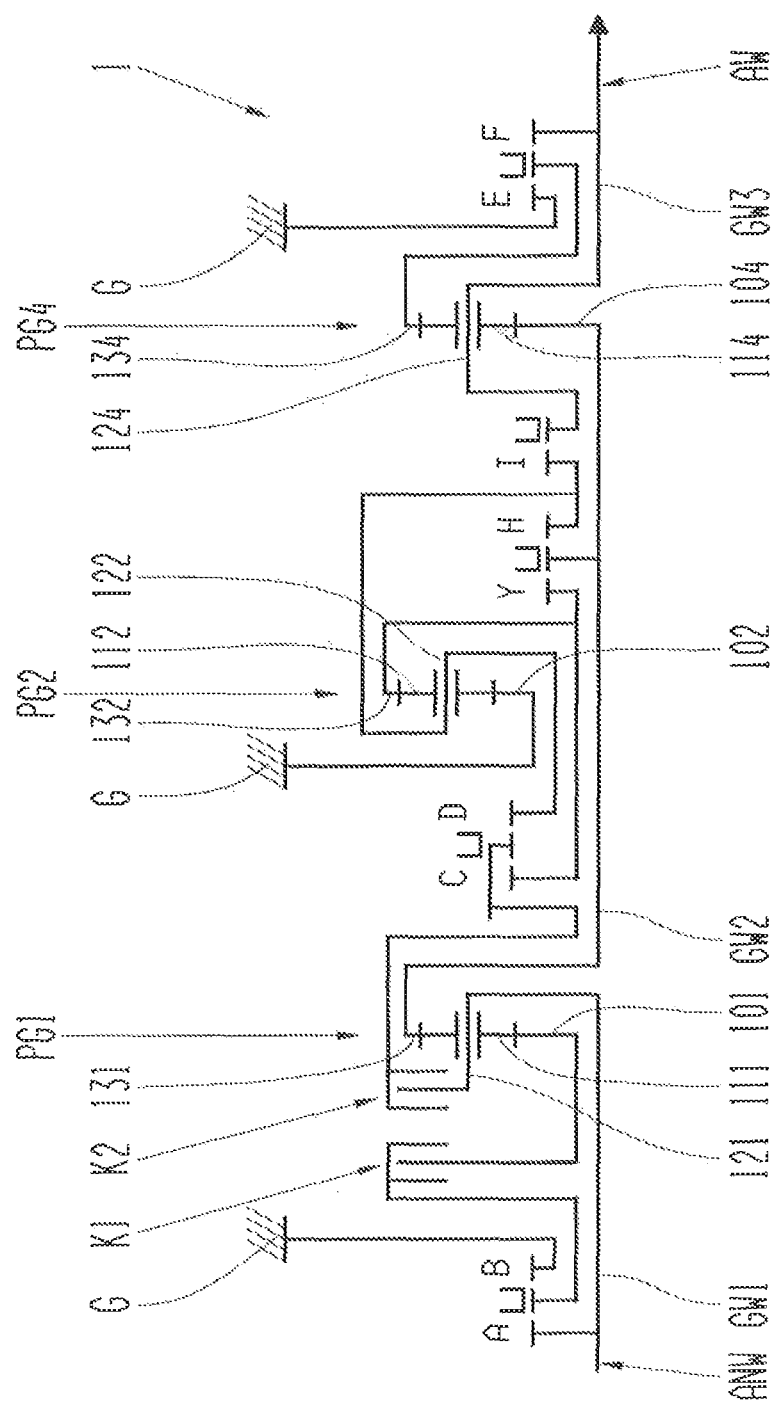

| GEAR | K1 | K2 | A | B | C | D | E | F | Y | H | I | i | phi |
|---|---|---|---|---|---|---|---|---|---|---|---|---|---|
| V1 |  | x |  |  | x | x |  |  |  | x |  | 3.8 |  |
| V2 | x |  | x |  |  |  | x |  |  |  |  | 2.88 | 1.30 |
| V3 | x | x |  | x |  |  | x |  | x |  |  | 2.21 | 1.30 |
| V4 | x |  |  | x |  | x | x |  |  |  |  | 1.69 | 1.30 |
| V5 |  | x |  |  | x |  |  |  |  |  | x | 1.30 | 1.30 |
| V6 | x |  | x |  |  | x |  | x |  |  |  | 1.00 | 1.30 |
| V7 |  | x |  |  |  |  |  | x | x |  |  | 0.77 | 1.30 |
| V8 | x |  |  | x |  |  |  | x |  |  |  | 0.59 | 1.30 |

Fig. 12c

|  | i0 | i_PG |
|---|---|---|
| PG1 | -1.43 | 0.59 |
| PG2 | -3.3 | 0.77 |
| PG3 | -3.3 | 1.30 |
| PG4 | -1.88 | 2.88 |

Fig. 12b

| GEAR | K1 | K2 | A | B | C | D | E | F | Y | i | phi |
|---|---|---|---|---|---|---|---|---|---|---|---|
| V1 |  | x | x |  |  |  |  |  | x | 8.4 |  |
| V2 | x |  |  |  | x |  | x |  |  | 5.50 | 1.53 |
| V3 | x | x |  |  |  |  | x |  |  | 3.60 | 1.53 |
| V4 | x |  |  | x |  |  | x |  |  | 2.29 | 1.57 |
| V5 |  | x | x |  |  | x |  |  |  | 1.53 | 1.50 |
| V6 | x |  |  |  |  |  |  | x |  | 1.00 | 1.53 |
| V7 |  | x |  |  | x |  |  | x |  | 0.66 | 1.53 |
| V8 | x |  |  | x |  |  |  | x |  | 0.42 | 1.57 |

Fig. 13c

|  | i0 | i_PC |
|---|---|---|
| PG1 | -1.4 | 0.42 |
| PG2 | -1.9 | 0.66 |
| PG3 | -1.9 | 1.53 |
| PG4 | -4.5 | 5.50 |

Fig. 13b

| GEAR | K1 | K2 | A | B | C | D | E | F | Y | i | phi |
|------|----|----|---|---|---|---|---|---|---|------|------|
| V1 | x | x |   |   |   |   |   |   | x | 3.7 |      |
| V2 | x |   | x |   |   |   | x |   |   | 2.88 | 1.30 |
| V3 | x | x |   |   | x |   | x |   |   | 2.22 | 1.30 |
| V4 | x |   |   | x |   |   | x |   |   | 1.69 | 1.31 |
| V5 |   | x | x |   |   | x |   |   |   | 1.30 | 1.30 |
| V6 |   |   |   |   | x |   |   | x |   | 1.00 | 1.30 |
| V7 |   | x |   |   |   |   |   | x |   | 0.77 | 1.30 |
| V8 |   |   |   | x |   |   |   | x |   | 0.59 | 1.31 |

Fig. 14c

|      | i0    | i    |
|------|-------|------|
| PG1  | -1.43 | 0.59 |
| iVG1 |       | 0.77 |
| iVG2 |       | 1.30 |
| PG4  | -1.88 | 2.88 |

Fig. 14b

TRANSMISSION FOR A MOTOR VEHICLE

This application claims priority from German patent application serial no. 10 2013 210 493.6 filed Jun. 6, 2013.

FIELD OF THE INVENTION

The invention concerns a transmission, in particular a multiple-gear transmission for a motor vehicle, comprising a housing, a drive input shaft, a drive output shaft, at least two planetary gearsets, wherein the planetary gearsets each comprise a sun gear, at least one planetary gearwheel, a planetary carrier and a ring gear, as well as a plurality of shifting elements.

BACKGROUND OF THE INVENTION

From DE 10 2013 202 045 a range-change transmission of a motor vehicle is known. The range-change transmission comprises a multiple-gear main transmission and a range group in drive connection downstream from the main transmission. In this case the range group is of planetary design and comprises two mutually coupled planetary gearsets each with a sun gear, a planetary carrier carrying a plurality of planetary gearwheels, and a ring gear. The two planetary gearsets of the range group are arranged coaxially and axially offset relative to one another, with the first planetary gearset positioned between the main transmission and the second planetary gearset. The sun gear of the first planetary gearset is connected in a rotationally fixed manner to the main shaft of the main transmission and so forms the input element of the range group. The planetary carrier of the first planetary gearset is connected rotationally fixed to the ring gear of the second planetary gearset. The ring gear of the first planetary gearset is connected rotationally fixed to the sun gear of the second planetary gearset. The planetary carrier of the second planetary gearset is connected rotationally fixed to the drive output shaft and thus forms the output element of the range group.

Furthermore, DE 10 2004 014 082 A1 discloses a dual clutch transmission of planetary design. The dual clutch transmission comprises four planetary gearsets, two friction shifting elements and a plurality of interlocking shifting elements. The friction shifting elements are designed for the engagement of various power paths in a force flow of the planetary transmission. The interlocking shifting elements, in turn, are designed for the engagement of various gear ratios in the power paths of the planetary transmission. In addition, the friction shifting elements and interlocking shifting elements are arranged between the shafts of the planetary gearsets, a housing of the planetary transmission or a component fixed to the housing, and a transmission input shaft and a transmission output shaft, in such manner that gearshifts can be carried out by means of the friction shifting elements without traction force interruption.

A disadvantage of this, among others, is that since the shifting elements are internal ones, through-going means of access are necessary for their actuation. Moreover, the two-step transmission described gives only six gears.

SUMMARY OF THE INVENTION

An objective of the present invention is therefore to provide a transmission for a motor vehicle, which enables good accessibility of the shifting elements, with a large number of gears and a compact structure. In addition, an objective of the present invention is to indicate an alternative transmission.

The present invention achieves those objectives with a transmission, in particular a multiple-gear transmission for a motor vehicle, which comprises a housing, a drive input shaft, a drive output shaft, at least two planetary gearsets each of which comprises a sun gear, at least one planetary gearwheel, a planetary carrier and a ring gear, as well as a plurality of shifting elements, characterized in that the carrier of the first planetary gearset is connected in a rotationally fixed manner to the drive input shaft, the ring gear of the second planetary gearset can be connected by means of a first shifting element to the housing and by means of a second shifting element to the carrier of the second planetary gearset, and the ring gear of the first planetary gearset is connected rotationally fixed to the sun gear of the second planetary gearset and the sun gear of the first planetary gearset can be connected by at least one third shifting element to the housing, or the sun gear of the first planetary gearset is connected rotationally fixed to the sun gear of the second planetary gearset and the ring gear of the first planetary gearset can be connected by at least one third shifting element to the housing and fixed thereto, and the majority, in particular all the shifting elements are arranged in the housing but are accessible from outside.

The invention also achieves its objectives with a motor vehicle, in particular a passenger vehicle or a utility vehicle, having a transmission according to the description.

The advantages of this, among others, are that the shifting elements are easily accessible and, for example, can be accessed by shifting forks from outside. Thus, no through-going access means are needed for actuating the shifting elements. Other advantages are a compact structure, low inertial masses and a high power density due to the division between a plurality of planetary gearwheels. Moreover, a sufficiently large number of gears can be obtained with this transmission.

By way of the drive input shaft, particularly preferably torque or rotational movement of a driveshaft, for example that of an internal combustion engine, is introduced into the transmission.

In what follows, the term shaft should not be understood to mean exclusively a—for example—cylindrical machine element mounted to rotate in order to transmit torques, but rather, the term is understood also to refer in general to connecting elements that connect individual components or elements to one another, in particular connecting elements that connect a plurality of elements to one another in a rotationally fixed manner.

In particular, two elements are said to be connected to one another when there is a firm, in particular rotationally fixed connection between the elements. In particular, elements so connected rotate at the same rotational speed.

Furthermore, two elements are said to be connectable when there is a releasable connection between those elements. In particular, the elements rotate at the same rotational speed when the connection has been formed.

In the present context the various components and elements of the invention can be connected to one another by way of a shaft or a connecting element, but also directly, for example by means of a weld joint, press fit or some other means of connection.

In the description and especially in the claims, a clutch should preferably be understood to mean a shifting element which, depending on its actuation condition, allows relative movement between two components or produces a fixed connection for the transmission of torque. Relative movement is understood to mean, for example, rotation of two components such that the rotational speeds of the first and of the second components are different. Moreover, it is also conceivable that only one of the two components rotates whereas the other component is stationary, or is rotating in the opposite direction.

In what follows, a non-actuated clutch is understood to be an open clutch. This means that the two components can move relative to one another. Correspondingly, when the clutch is closed the two components rotate at the same rotational speed in the same direction.

Preferably in the description and especially in the claims, a brake should be understood to mean a shifting element which is connected on one side to a fixed element such as a housing, and on another side to an element that can rotate.

In what follows, a non-actuated brake is understood to be an open brake. This means that the rotating component can rotate freely, i.e. the brake preferably has no effect on the rotational speed of the rotating component. When the brake is actuated or closed, the rotational speed of the rotating component is reduced until the rotation stops, i.e. a firm connection can be formed between the rotating element and the fixed element. In this connection the terms 'element' and 'component' are equivalent. Basically, shifting elements can also be used in a manner such that they are closed when not actuated and open when actuated. Correspondingly, the association between their function and their shift condition is then understood to be the converse of the shift conditions described above. The example embodiments described below with reference to the figures are primarily based on an arrangement in which an actuated shifting element is closed and a non-actuated shifting element is open.

A planetary gearset comprises a sun gear, a planetary carrier or carrier, and a ring gear. Mounted to rotate on the planetary carrier or carrier are planetary gearwheels or planetaries, which mesh with the teeth of the sun gear and/or with the teeth of the ring gear.

Below, a 'minus' planetary gearset is a planetary gearset with a planetary carrier on which the planetary gearwheels are mounted to rotate, with a sun gear and with a ring gear, wherein the teeth of at least one of the planetary gearwheels mesh both with the teeth of the sun gear and also with those of the ring gear, so that the ring gear and the sun gear rotate in opposite directions when the planetary carrier is fixed and the sun gear is rotating.

A 'plus' planetary gearset differs from the 'minus' planetary gearset just described, in that the plus planetary gearset has inner and outer planetary gearwheels which are mounted to rotate on the planetary carrier. The teeth of the inner planetary gearwheels mesh on one side with the teeth of the sun gear and on the other side with those of the outer planetary gearwheels. In addition the teeth of the outer planetary gearwheels mesh with those of the ring gear. As a result, when the planetary carrier is fixed, the ring gear and the sun gear rotate in the same direction.

The use of planetary gearsets enables particularly compact transmissions to be made, and this in turn allows great freedom in the arrangement of the transmission in the vehicle.

The elements of a planetary gearset are in particular understood to be the sun gear, the ring gear, the planetary carrier or carrier and the planetary gearwheels or planetaries of the planetary gearset.

Particularly preferably the shifting elements can be actuated selectively, i.e. according to need, whereby various gears that give different gear ratios between the drive input shaft and the drive output shaft can be obtained. The larger the number of gears is, the finer can a gear gradation over a large transmission spread be achieved, so that for example an internal combustion engine of a motor vehicle can be operated in an optimum rotational speed range and therefore as economically as possible. At the same time this contributes toward increasing the driving comfort since the internal combustion engine can preferably be operated at a low rotational speed level. Accordingly for example, the noise emitted by operating the internal combustion engine is reduced.

Furthermore, the shifting elements can be designed such that energy is needed for changing the shift condition of a shifting element, but not for maintaining the shift condition itself.

For that purpose, shifting elements are particularly suitable which can be actuated according to need, such as electromechanical or electromagnetic shifting elements. Particularly by comparison with conventional, hydraulically actuated shifting elements, these are noted for particularly low and efficient energy demand, since they can be operated almost free from losses. Moreover, in an advantageous manner there is no need to permanently maintain a control pressure for actuating the—for example—conventional hydraulic shifting elements or for permanently acting upon the shifting element concerned with the hydraulic pressure required in order to keep it in its engaged condition. Accordingly, for example, further components such as a hydraulic pump can be omitted, provided that such components serve exclusively for the control and supply of the conventional, hydraulically actuated shifting elements. If other components are supplied with lubricant not by way of a separate lubricant pump but by the same hydraulic pump, then the latter can at least be made smaller. Besides, any leaks at oil transfer points of the hydraulic circuit, in particular at rotating components, are eliminated. Particularly preferably, this also contributes to increasing the efficacy of the transmission by boosting its efficiency.

When shifting elements of the above-mentioned type that can be actuated as necessary are used, it is particularly advantageous if these can be accessed easily from outside. Among other things this has the advantage that the shifting energy required can be easily supplied to the shifting elements. Accordingly, it is particularly preferred to arrange the shifting elements so as to be easily accessible from outside, In the context of shifting elements, 'easily accessible from outside' means that no other components are arranged on intermediate housings of the transmission and the shifting element, and particularly preferably, that the shifting elements are arranged on the drive input shaft or on the drive output shaft.

The term "connectability" is preferably understood in the description and particularly in the claims, to mean that in different geometrical positions the same connection or joining of interfaces is ensured, without intersection of individual connecting elements or shafts.

The term "fixed gear ratio" is understood to mean the gear ratio which is produced by virtue of the gear ratio between the sun gear and the ring gear of the planetary gearset concerned, when the planetary carrier or carrier is stationary. Further advantageous embodiments, features and advantages of the invention are described.

Expediently, the transmission comprises a further planetary gearset such that at least two of the planetary gearsets are in particular arranged geometrically one behind another in the transmission and/or at least two of the planetary gearsets are arranged one nested within another, in particular in such manner that the second planetary gearset is arranged within a fourth planetary gearset and/or a fifth planetary gearset is arranged within a sixth planetary gearset. One of the advantages achieved thereby is that the transmission can be made axially even more compact in this way.

Advantageously, a third planetary gearset is arranged between the first and second planetary gearsets or between the first and fourth planetary gearsets, with the sun gear of the third planetary gearset connected to the housing or able to be connected to the housing by means of a fourth shifting element. If a third planetary gearset is so arranged between the two planetary gearsets, the number of possible gears that can be obtained by the transmission is farther increased thereby.

Expediently, the fourth shifting element is a friction shifting element, in particular a brake, or an interlocking shifting element. For example, if the fourth shifting element is a brake, then as necessary the transmission element functionally connected to the brake can be connected fixed to the housing in a simple manner. If the shifting element is in the form of an interlocking or frictional shifting element, then transmission elements can be inexpensively and reliably coupled with it.

Advantageously, the carrier of the third planetary gearset is connected in a rotationally fixed manner to the carrier of the first planetary gearset, or it can be connected to the carrier of the first planetary gearset by means of at least one shifting element. If shifting elements are arranged for coupling the carrier of one planetary gearset to the carrier of another planetary gearset, the number of gears that can be obtained by the transmission is farther increased thereby.

Expediently an electric machine is provided, which is designed in particular for actuating the fifth shifting element. This electric machine can provide electrical assistance for the traction force. Moreover, the fifth shifting element can be actuated particularly reliably by the electric machine.

Advantageously, the sun gear of the fourth planetary gearset is connected firmly to the housing or can be connected fixed to the housing by a shifting element, and/or it can be connected in a rotationally fixed manner by a shifting element to the ring gear of the fourth planetary gearset or to the ring gear of the third planetary gearset. An advantage achieved by a fixed connection of the sun gear of a planetary gearset to the housing, is that the structure of the transmission can be simplified.

Expediently, the carrier of the fourth planetary gearset is connected rotationally fixed to the carrier of the second planetary gearset, or it can be connected to the carrier of the second planetary gearset by a shifting element, and/or it can be connected by means of a shifting element to the carrier of the first planetary gearset. A rotationally fixed connection of a carrier of one planetary gearset to a carrier of another planetary gearset has the advantage that the structure of the transmission can be simplified even more.

Advantageously, the fifth and sixth planetary gearsets are nested and form a reversing-gear group for the provision of at least one reversing gear, wherein the reversing-gear group is arranged at the output of the transmission and wherein the sun gear of the fifth planetary gearset is connected rotationally fixed to the carrier of the second planetary gearset, and the carrier of the fifth planetary gearset can be connected fixed to the housing by means of a shifting element for a reversing gear, and wherein the sun gear of the sixth planetary gearset can be connected fixed to the housing by a shifting element and to the carrier of the fifth planetary gearset by a shifting element. The reversing-gear group can be integrated in a transmission in a simple manner. Furthermore, the nested arrangement of the fifth and sixth planetary gearsets enables the transmission to be made axially even more compact.

Expediently, the fifth planetary gearset is arranged at the input of the transmission and the sun gear of the fifth planetary gearset is formed rotationally fixed with the drive input shaft, while the carrier of the fifth planetary gearset can be connected fixed to the housing by a shifting element in order to provide at least one reversing gear, or can be connected by a shifting element to the drive input shaft in order to provide at least one forward gear. By providing the fifth planetary gearset at the input of the transmission, an upstream intermediate group can be created in a simple manner.

Advantageously, the first planetary gearset and the second planetary gearset form a first partial transmission and the second planetary gearset, together with the third planetary gearset and the fourth planetary gearset, form a second partial transmission. In this configuration the first planetary gearset provides a range group used in common by both partial transmissions, which despite a large number of obtainable gears, does not increase the fitting space occupied by the transmission or at least not substantially so.

Advantageously, an intermediate gear system forms a second partial transmission, wherein the intermediate system comprises at least one countershaft and at least two gearwheel planes. By virtue of the two gearwheel planes of the upstream group a double gear interval can be covered.

Expediently, a separator clutch is provided as a starting clutch, which connects a drive engine to the transmission shaft at the input of the transmission. For example during traction force support by an electric machine, the separator clutch can be used as a starting clutch if the energy accumulator of the electric machine has run down or if the power of the electric machine is too low.

Advantageously, by means of at least nine shifting elements and at least two powershift elements, as well as six planetary gearsets, at least 14 forward gears and at least seven reversing gears can be obtained. In this way a sufficiently large number of forward and reversing gears are made available, which improves the flexibility of the transmission in relation to its use in a variety of vehicles.

Further important characteristics and advantages of the invention emerge from the drawings, and from the associated figure descriptions that relate to the drawings.

It is understood that the features mentioned above and those still to be explained below, can be used not only in the combination indicated in each case but also in other combinations or in isolation, without going beyond the scope of the present invention.

BRIEF DESCRIPTION OF THE DRAWINGS

Preferred designs and embodiments of the invention are illustrated in the drawings and will be explained in more detail in the description given below, wherein the same indexes refer to the same, or similar, or functionally equivalent components or elements.

The drawings show, in each case schematically:

FIG. 1a: A transmission according to a first embodiment of the present invention;

FIG. 1b: A gear ratio scheme for a transmission as in FIG. 1a;

FIG. 1c: A shifting matrix for a transmission as in FIG. 1a;

FIG. 2b: A gear ratio scheme for a transmission as in FIG. 2a;

FIG. 2c: A shifting matrix for a transmission as in FIG. 2a;

FIG. 3: A transmission according to a third embodiment of the present invention;

FIG. 5b: A shifting matrix for a transmission as in FIG. 5a;

FIG. 6: A transmission according to a sixth embodiment of the present invention;

FIG. 7b: A gear ratio scheme for a transmission as in FIG. 7a;

FIG. 7c: A shifting matrix for a transmission as in FIG. 7a;

FIG. 8a: A transmission according to an eighth embodiment of the present invention;

FIG. 8b: A gear ratio scheme for a transmission as in FIG. 8a;

FIG. 8c: A shifting matrix for a transmission as in FIG. 8a;

FIG. 9b: A gear ratio scheme for a transmission as in FIG. 9a;

FIG. 9c: A shifting matrix for a transmission as in FIG. 9a;

FIG. 10b: A gear ratio scheme for a transmission as in FIG. 10a;

FIG. 10c: A shifting matrix for a transmission as in FIG. 10a;

FIG. 11b: A gear ratio scheme for a transmission as in FIG. 11a;

FIG. 11c: A shifting matrix for a transmission as in FIG. 11a;

FIG. 12a: A transmission according to a twelfth embodiment of the present invention;

FIG. 12b: A gear ratio scheme for a transmission as in FIG. 12a;

FIG. 12c: A shifting matrix for a transmission as in FIG. 12a;

FIG. 13b: A gear ratio scheme for a transmission as in FIG. 13a;

FIG. 13c: A shifting matrix for a transmission as in FIG. 13a;

FIG. 14b: A gear ratio scheme for a transmission as in FIG. 14a;

FIG. 14c: A shifting matrix for a transmission as in FIG. 14a;

DETAILED DESCRIPTION OF THE PREFERRED EMBODIMENTS

Figure 2A:
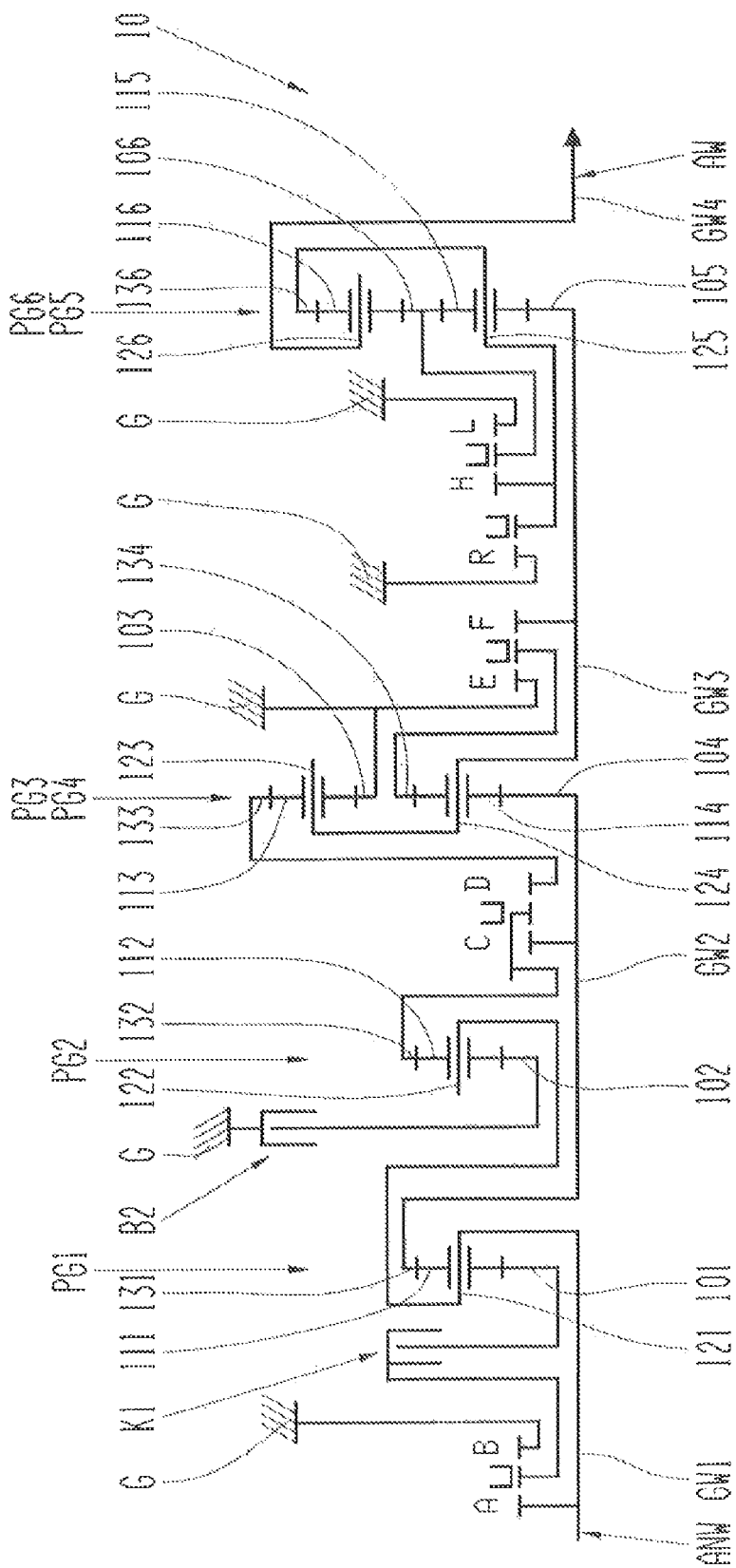
FIG. 2a: A transmission according to a second embodiment of the present invention.

FIG. 1a shows a transmission according to a first embodiment of the present invention.

In FIG. 1a the index 1 denotes a multiple-gear transmission, such that the multiple-gear transmission 1 can for example be designed in the form of a dual clutch transmission with seven gears including two overdrive gears. In this case, FIG. 1a and the subsequent FIGS. 2a to 15 show in each case only half of the rotationally symmetrical transmission.

The transmission 1 comprises eight shifting elements in the form of a clutch K1, a brake B2 and six shifting elements A, B, C, D, E and F as well as four planetary gearsets PG1, PG2, PG3, PG4. In this case the six shifting elements A, B, C, D E and F form, for example, three dual shifting elements NB, C/D and E/F. By means of the clutch K1 the drive input side can be coupled or connected to the drive output side for the transmission of force and torque, by way of shafts, shifting elements and/or planetary gearsets. Preferably most, or particularly preferably all of the shifting elements of the transmission 1 are arranged, accessibly from the outside, in a housing G for the transmission, so that they can be actuated from outside, for example by means of shifting forks or the like. This applies to all embodiments of the invention and in particular to the example embodiments described in FIGS. 1 to 15.

Below, the general structure of the first planetary gearset PG1, the second planetary gearset PG2, the third planetary gearset PG3 and the fourth planetary gearset PG4 will be described. The planetary gearsets PG1, PG2, PG3, PG4 have in each case a sun gear 101, 102, 103, 104, which co-operates with at least one planetary gearwheel 111, 112, 113, 114 for the transfer of force and torques. On the radially outer side of the respective planetary gearwheels of the first, second, third and fourth planetary gearsets PG1, PG2, PG3, PG4 there are arranged respective ring gears 131, 132, 133, 134 in which the respective planetary gearwheels 111, 112, 113, 114 engage for the transfer of force and torques. The planetary gearwheels 111, 112, 113, 114 are in each case mounted to rotate on a corresponding planetary carrier 121, 122, 123, 124.

The sun gear 101 of the first planetary gearset PG1 can be coupled or connected to the clutch K1. For this a dual shifting element A/B is provided, which combines the two shifting elements A and B. When the first shifting element A is actuated or closed, it connects a first transmission shaft GW1 to the clutch K1 and if in addition the clutch K1 is actuated, the first transmission shaft GW1 is correspondingly connected to the sun gear 101. In FIG. 1a the first transmission shaft GW1 is the drive input shaft ANW. If the second shifting element B is closed or actuated, the clutch K1 is connected to the housing G and if in addition the clutch K1 is actuated, the housing G is correspondingly connected to the sun gear 101. The ring gear 131 of the first planetary gearset PG1 is connected in a rotationally fixed manner to a second transmission shaft GW2, as also is the sun gear 104 of the fourth planetary gearset PG4. Thus, the ring gear 131 is connected rotationally fixed to the sun gear 104 of the fourth planetary gearset PG4. Furthermore, the planetary gearwheel 111 of the first planetary gearset PG1 is mounted to rotate on a carrier/planetary carrier 121. The carrier 121 of the first planetary gearset PG1 is connected in a rotationally fixed manner, on the one hand to the drive input shaft ANW and on the other hand to the carrier 122 of the second planetary gearset PG2.

The planetary gearwheel 112 of the second planetary gearset PG2 is mounted to rotate on the carrier 122 of the second planetary gearset PG2. The sun gear 102 of the second planetary gearset PG2 can be connected rotationally fixed to the housing G by means of the brake B2. The ring gear 132 of the second planetary gearset PG2 can be coupled by means of the second dual shifting element C/D, which in this case combines the two shifting elements C and D. By means of the third shifting element C, the ring gear 132 of the second planetary gearset PG2 can be coupled to the ring gear 133 of the third planetary gearset PG3. Furthermore, by means of the fourth shifting element D the ring gear 132 can be connected rotationally fixed to the second transmission shaft GW2 and correspondingly to the sun gear 104 of the fourth planetary gearset PG4.

The fourth planetary gearset PG4 is arranged radially and coaxially inside the third planetary gearset PG3. The sun gear 103 of the third planetary gearset PG3 is connected to the housing G and is thus fixed relative to the housing. The planetary gearwheel 113 of the third planetary gearset PG3 is mounted to rotate on the carrier 123 of the third planetary gearset PG3 and the carrier 123 of the third planetary gearset PG3 is connected in a rotationally fixed manner to the carrier 124 of the fourth planetary gearset PG4. The two carriers 123 and 124 of the third and fourth planetary gearsets PG3 and PG4, which are connected rotationally fixed to one another, are in turn connected rotationally fixed to a third transmission shaft GW3, which in this case forms the drive output shaft AW. The sun gear 104 of the fourth planetary gearset PG4 is, as described earlier, connected rotationally fixed to the second transmission shaft GW2 and correspondingly also to the ring gear 131 of the first planetary gearset PG1. The ring gear 134 of the fourth planetary gearset PG4 can be coupled by means of the third dual shifting element E/F, which in this case combines the two shifting elements E and F. By means of the fifth shifting element E, the ring gear 134 of the fourth planetary gearset PG4 can be connected rotationally fixed to the housing G. When this is closed, the ring gear 134 and the sun gear 103 of the third planetary gearset PG3 are connected to the housing G and are thus fixed relative to the housing. By means of the sixth shifting element F, the ring gear 134 of the fourth planetary gearset PG4 can in turn be connected to the drive output shaft AW.

The transmission, as shown in FIG. 1a, has a first and a second partial transmission TG1 and TG2. The first partial transmission TG1 comprises the first and fourth planetary gearsets PG1 and PG4, and the second partial transmission TG2 comprises the second, third and fourth planetary gearsets PG2, PG3 and PG4.

The first partial transmission TG1 has 2×2=4 gear ratios. The first dual shifting element NB engages two gear ratios. The gear interval k amounts geometrically, for example, to 1.3.

The second shifting element B engages an overdrive gear ratio $k^{-2}$, which is enabled by the first planetary gearset PG1. The term "overdrive" means that in a so-termed overdrive gear the drive input shaft ANW rotates more slowly than the drive output shaft AW. The drive output takes place from the drive input shaft ANW and the carriers 121 and 122 of the first and second planetary gearsets PG1 and PG2 connected rotationally fixed to it. In turn, the drive output takes place by way of the ring gear 131 of the first planetary gearset PG1 and the sun gear 104 of the fourth planetary gearset PG4 connected rotationally fixed to it by means of the second transmission shaft GW2. The sun gear 103 of the third planetary gearset PG3 is fixed relative to the housing, as described earlier. Thus, this is a minus transmission. Furthermore, by means of the first shifting element A, a direct gear i=1 can be engaged. In that case the first planetary gearset PG1 rotates as a block. These two gear ratios, which can be engaged by the first shifting element A and the second shifting element B, are doubled by the fourth planetary gearset PG4, thus producing four gears. Thus, the fourth planetary gearset PG4 constitutes a range group used in common by both of the partial transmissions TG1 and TG2. The drive input shaft ANW extends through the first partial transmission TG1, to the second partial transmission TG2.

As described earlier, the second partial transmission TG2 comprises the second, third and fourth planetary gearsets PG2, PG3 and PG4, and has 1×2+1=3 gear ratios. The third shifting element C engages an overdrive ratio $k^{-1}$ for the second partial transmission TG2. In this case the drive input takes place by way of the drive input shaft ANW and the carriers 121 and 122 of the first and second planetary gearsets PG1, PG2 connected rotationally fixed to it. In turn the drive output takes place by way of the ring gear 131 of the first planetary gearset PG1, and by means of the third shifting element C the ring gear 132 of the second planetary gearset PG2 can be connected to the ring gear 131 of the first planetary gearset PG1. As described earlier, the sun gear 103 of the third planetary gearset PG3 is fixed relative to the housing. This overdrive gear ratio $k^{-1}$ is doubled by virtue of the fourth planetary gearset PG4, i.e. 1×2 applies. The fourth shifting element D engages a gear with ratio $k^1$ independently of the range group formed by the fourth planetary gearset PG4. This is produced by the second and third planetary gearsets PG2 and PG3 together. In this case the second planetary gearset PG2 produces the ratio $k^{-1}$ and the third planetary gearset PG3 produces the ratio $k^2$. When connected one behind the other that gives a gear ratio $k^{-1}$. That gear is doubled by the fourth planetary gearset PG4. In this way the fourth planetary gearset PG4 can be shifted while free from load by means of the third dual shifting element E/F as a background shift.

FIG. 1b shows a gear ratio scheme for a transmission as in FIG. 1a.

FIG. 1b shows as an example a ratio table for gear ratios of the four planetary gearsets PG1 to PG4 of the transmission shown in FIG. 1a. In this a respective fixed transmission ratio i0 is shown for the planetary gearsets PG1 to PG4 and a respective ratio of the planetary gearset i_PG is shown for the planetary gearsets PG1 to PG4.

FIG. 1c shows a shifting matrix for a transmission as in FIG. 1a.

FIG. 1c shows in addition an example shifting matrix for the transmission of FIG. 1a. In the shifting matrix shown in FIG. 1c, crosses are only entered for those of the shifting elements, i.e. the shifting elements A to F, the clutch K1 and the brake B2, which are needed for each of the forward gears V1 to V7 and which are actuated or closed in the gear concerned in each case. In the next to last column of the shifting matrix, examples of the gear ratios i of the engaged forward gears V1 to V7 are indicated. In addition, in the last column of the shifting matrix the resulting gear ratio phi of the gear next-lower than the forward gear V1 to V7 concerned is shown.

The advantage of the transmission as shown in FIG. 1a and referring to the gear ratio table in FIG. 1b and the shifting matrix in FIG. 1c, is that all the shifting elements are accessible from the outside. Furthermore, no through-going access points are needed for shifting forks.

Such a powershift transmission would be incomplete without a reversing gear, or R-gear for short. Thus, the gearset represented in FIG. 1a and the associated FIGS. 1b and 1c serves as a basis for various variants of reversing gears, or R-gears for short in what follows.

The synchronization of the shifting elements A to F can for example take place conventionally, in the form of individually synchronized shifting elements or by a central synchronizing system for both of the partial transmissions TG1 and TG2, for example by means of a transmission brake and/or by means of one or more electric machines.

Since the third and fourth planetary gearsets PG3 and PG4 are in a nested arrangement, axial fitting space can be saved. Such nesting is possible because of the quantitatively small fixed gear ratio i0 of the outer, third planetary gearset PG3. In this case the transmission ratio amounts, for example, to i0_PG3=−1.43, i.e. the sun gear 103 of the third planetary gearset PG3 has a large diameter.

Basically, however, the third and fourth planetary gearsets PG3 and PG4 could also be arranged next to one another.

Moreover the frictional shifting elements, i.e. the clutch K1 and the brake B2, can also be designed as nested at the periphery of the first and second planetary gearsets PG1 and PG2. The advantage of this is that axial fitting space can again be saved.

FIG. 2a shows a transmission according to a second embodiment of the invention.

FIG. 2a shows a multiple-gear transmission, in this case a dual clutch transmission 10 with fourteen gears, including two overdrive gears, of planetary design. The dual clutch transmission with its seven gears and the two overdrive gears corresponds in its configuration substantially to the transmission 1 in FIG. 1a, which will be referred to in what follows as the main transmission, extended by a range group with three ranges (Low, High and R).

The dual clutch transmission 10 differs from the transmission 1 in FIG. 1a in that, in addition, a fifth and a sixth planetary gearset PG5 and PG6 and three more shifting elements R, H and L are provided. In this case, for example, the dual shifting element H/L combines the two shifting elements H and L.

The two additional planetary gearsets PG5 and PG6 are now connected as follows: the carrier 134 of the fourth planetary gearset PG4 is connected in a rotationally fixed manner to the third transmission shaft GW3, as also is the sun gear 105 of the fifth planetary gearset PG5. The fifth planetary gearset PG5 has a planetary gearwheel 115 mounted to rotate on a carrier 125. The carrier 125 is, moreover, connected rotationally fixed to a ring gear 136 of the sixth planetary gearset PG6. The sixth planetary gearset PG6 also has a planetary gearwheel 116, which is mounted to rotate on a carrier 126 of the sixth planetary gearset PG6. The carrier 126 of the sixth planetary gearset PG6 is connected to a drive output shaft AW.

As described earlier, an additional shifting element R is provided. When actuated or closed, this shifting element R connects the carrier 125 of the fifth planetary gearset PG5 to the housing in a rotationally fixed manner.

Furthermore the additional, fourth dual shifting element H/L is provided. When actuated or closed, the shifting element H connects the carrier 125 of the fifth planetary gearset PG5 to the sun gear 106 of the sixth planetary gearset PG6. In contrast, when the shifting element L is actuated or closed, it connects the carrier 125 of the fifth planetary gearset PG5 to the housing G.

The range group, with which at least one reversing gear can be obtained, comprises the inner, fifth planetary gearset PG5 and the outer, sixth planetary gearset PG6 as well as the shifting elements L, H and R. In the embodiment shown in FIG. 2a, the number of gears of the main transmission 10 can be doubled by one of the three shifting elements L, H, R.

The 7-8 shift, i.e. the shift from the seventh gear V7 to the eighth gear V8, is traction force interrupted due to the change from L for "low" to H for "high". This enables the use of the transmission particularly in trucks.

The gear interval V7-V8, i.e. the interval from the seventh to the eighth gear, can also for example be chosen smaller because of the speed loss of the vehicle during the traction force interrupted shift. All the reversing gears or R-gears can be powershifted between one another. In contrast, the forward/reverse switch using the shifting elements L and R cannot be powershifted.

An advantage of this embodiment according to FIG. 2a is that all the shifting elements A to F and the clutch K1 and the brake B2 are accessible from outside.

The supplementation with a range group as shown in FIG. 2a is possible with all the main transmission variants described in the present application. The range group can provide at least one reversing gear.

FIG. 2b shows a gear ratio scheme for a transmission as in FIG. 2a.

FIG. 2b shows as an example a gear ratio table for gear ratios of the six planetary gearsets PG1 to PG6 of the transmission in FIG. 2a. In this a respective fixed transmission ratio i0 is shown for the planetary gearsets PG1 to PG6 and a respective ratio of the planetary gearset i_PG is shown for the planetary gearsets PG1 to PG6.

FIG. 2c shows a shifting matrix for a transmission as in FIG. 2a.

FIG. 2c shows in addition an example shifting matrix for the transmission of FIG. 2a. In the shifting matrix shown in FIG. 2c, crosses are only entered for those of the shifting elements, i.e. the shifting elements A to F, L, H and R and for the clutch K1 and the brake B2, which are needed for the forward gears V1 to V14 and the reversing gears R1 to R7 and which are actuated or closed in the gear concerned in each case, otherwise they are open. In the next to last column of the shifting matrix examples of the gear ratios i of the engaged forward gears V1 to V14 and the reversing gears R1 to R7 are indicated. In addition, in the last column of the shifting matrix the resulting gear ratio phi of the gear next-lower than the gear concerned is shown. Thus, by means of the transmission 10 according to FIG. 2a at least 14 forward gears and at least 7 reversing gears can be obtained.

FIG. 3 shows a transmission according to a third embodiment of the present invention.

FIG. 3 shows still another multiple-gear transmission 10. In this case the multiple-gear transmission 10 is an embodiment having at least one reversing gear, or R-gear for short, which can be obtained by virtue of a reversing gearset or planetary gearset PG5 of the transmission input.

In its structure the main transmission 1 of the multiple-gear transmission 10 corresponds to the transmission 1 according to FIG. 1a, so that as regards the structure of the main transmission 1 reference should be made to the description of FIGS. 1a to 1c.

The multiple-gear transmission 10 differs from the transmission 1 according to FIG. 1a in that it contains, in addition, the fifth planetary gearset PG5 and two shifting elements V and R. The two shifting elements V and R are, for example, combined in a dual shifting element WR. The fifth planetary gearset PG5 and the dual shifting element WR form an upstream group and are positioned at the transmission input of the main transmission 1. In the embodiment of the multiple-gear transmission 10 shown in FIG. 3, to obtain the forward gears the shifting element V is always engaged and to obtain the reversing gears the shifting element R of the dual shifting element WR is always engaged.

As shown in FIG. 3, the sun gear 105 of the fifth planetary gearset PG5 is connected in a rotationally fixed manner to the drive input shaft ANW and the first transmission shaft GW1. Furthermore, the fifth planetary gearset PG5 comprises a planetary gearwheel 115 which is mounted to rotate on a carrier 125. Moreover, the ring gear 135 of the fifth planetary gearset PG5 is connected rotationally fixed to the second transmission shaft GW2 and correspondingly, it is also rotationally fixed relative to the carrier 111 of the first planetary gearset PG1. The carrier 111 is also connected to the second transmission shaft GW2 in a rotationally fixed manner. When the shifting element V for the forward gear is actuated, the shifting element V connects the drive input shaft ANW and the sun gear 105 of the fifth planetary gearset PG5 connected rotationally fixed to it, to the carrier 115 of the fifth planetary gearset PG5. On the other hand, when the shifting element R for obtaining a reversing gear is actuated, then the shifting element R connects the carrier 115 of the fifth planetary gearset PG5 to the housing G, so that the carrier 115 is fixed relative to the housing.

In the embodiment of the multiple-gear transmission 10 shown in FIG. 3, the reversing gears are shorter than the corresponding forward gears, and this by the factor of the fixed transmission ratio i0 of the fifth planetary gearset PG5. In the short reversing gears or R-gears a VM (combustion engine) engine limitation or limitation of a drive engine can be provided for, since otherwise the R-gear is relevant for the design of the multiple-gear transmission and its torque loading.

The short R-gears have the advantage that they are more sensitive when maneuvering in reverse. A low driving speed is produced during VM idling or idling of the drive engine when the clutch K1 is closed. Moreover, the R-gears can be powershifted between one another.

Figure 4:
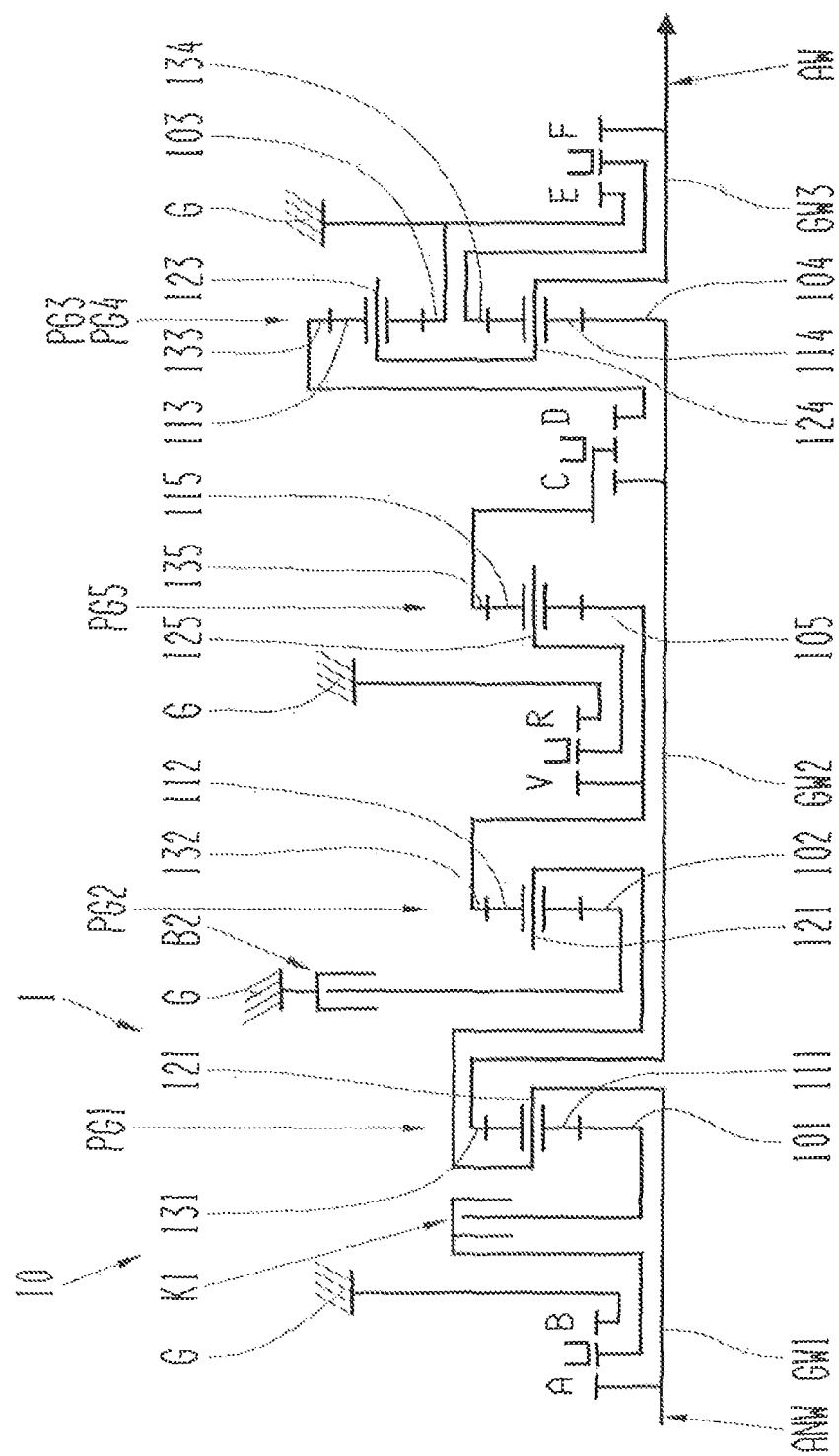
FIG. 4: A transmission according to a fourth embodiment of the present invention.

FIG. 4 shows a transmission according to yet a fourth embodiment of the present invention.

FIG. 4 shows a further multiple-gear transmission. In this case the multiple-gear transmission 10 is an example embodiment in which at least one reversing gear can be obtained by means of a reversing gearset or fifth planetary gearset PG5 within the second partial transmission TG2.

The structure of the main transmission 1 of the multiple-gear transmission 10 corresponds to the transmission shown in FIG. 1a, so that as regards the structure of the main transmission reference should be made to the description relating to FIGS. 1a to 1c.

This multiple-gear transmission 10 differs from the transmission in FIG. 1a, in that in addition, the fifth planetary gearset PG5 and the shifting elements V and R are provided. The two shifting elements V and R are combined, for example, in a dual shifting element. In this embodiment the fifth planetary gearset PG5 and the shifting elements V and R are located within the second partial transmission TG2. In the embodiment of the multiple-gear transmission 10 shown in FIG. 4 the shifting element V is again always actuated to obtain forward gears and the shifting element R of the dual shifting element V/R is always actuated to obtain reversing gears.

In the embodiment shown in FIG. 4 the sun gear 105 of the fifth planetary gearset PG5 is connected rotationally fixed to the ring gear 132 of the second planetary gearset PG2. The planetary gearwheel 115 of the fifth planetary gearset PG5 is mounted to rotate on the carrier 125 of the fifth planetary gearset PG5 and the carrier 125 can be coupled by means of the fourth dual shifting element V/R. In turn, the ring gear 135 of the fifth planetary gearset PG5 can be coupled by means of the second dual shifting element C/D. When the shifting element V is actuated so as to obtain a forward gear, it connects the carrier 125 to the sun gear 105 of the fifth planetary gearset PG5. On the other hand when the shifting element R is actuated so as to obtain a reversing gear, it connects the carrier 125 of the fifth planetary gearset PG5 to the housing G so that the carrier 125 is fixed relative to the housing. Moreover, when the third shifting element C is actuated, it connects the ring gear 135 of the fifth planetary gearset PG5 to the sun gear 104 of the fourth planetary gearset PG4. In contrast, if the fourth shifting element D is actuated it connects the ring gear 135 of the fifth planetary gearset PG5 to the ring gear 133 of the third planetary gearset PG3.

In this embodiment the reversing or R-gears are made shorter than the corresponding forward gears of the second partial transmission TG2, and this by the factor of the fixed gear ratio 10 of the fifth planetary gearset PG5. The R-gears can be powershifted between one another. Moreover the change between forward and reversing gears can be powershifted if a forward gear is preselected in the first partial transmission TG1 and a reversing gear is preselected in the second partial transmission TG2. This is advantageous for dynamic reversing or for rocking back and forth to emerge from a depression.

Figure 5A:
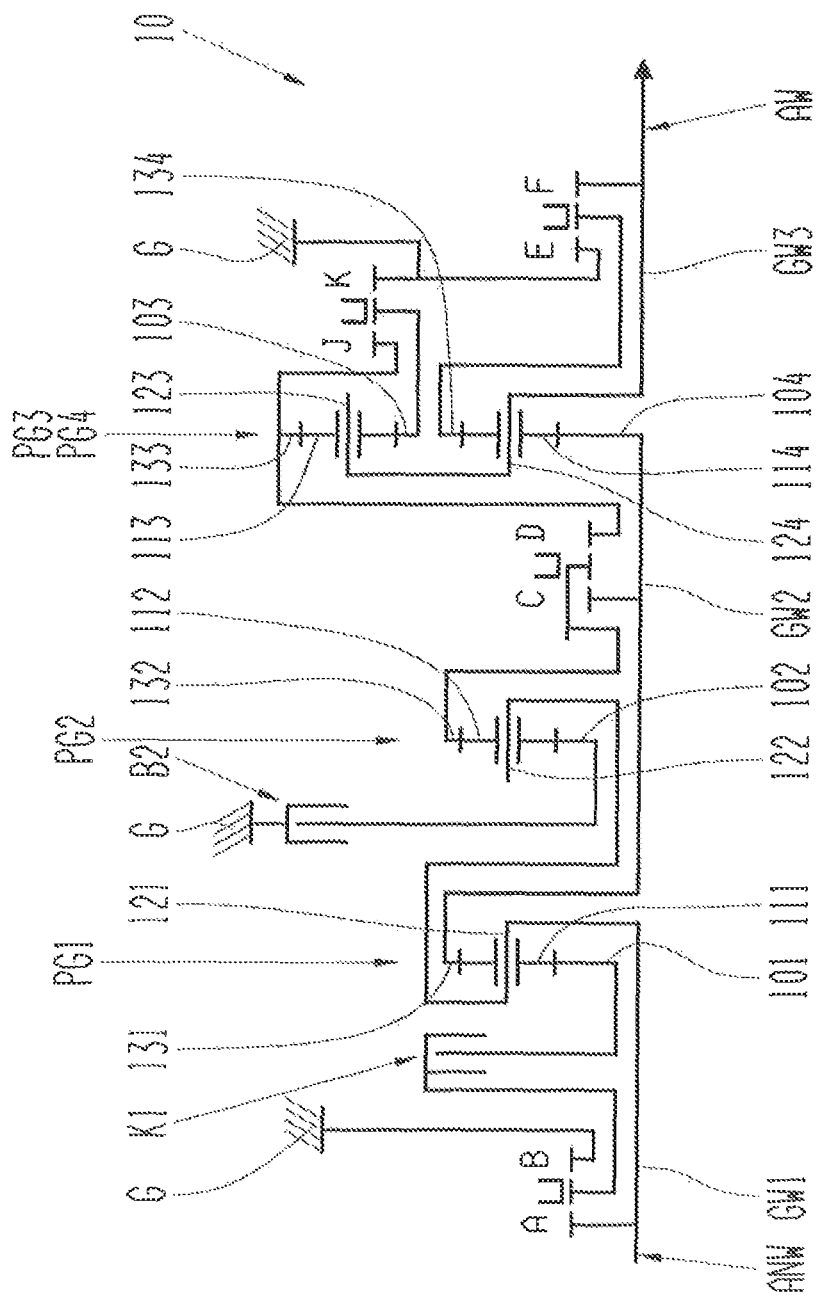
FIG. 5a: A transmission according to a fifth embodiment of the present invention.

FIG. 5a shows a transmission according to a fifth embodiment of the present invention.

FIG. 5a shows still another multiple-gear transmission 10. In this case the multiple-gear transmission 10 is a variant of the transmission 1 according to FIG. 1a, wherein the third planetary gearset PG3 rotates as a block and there are additional shifting elements J and K which, for example, are combined in a dual shifting element J/K. The transmission 1 shown in FIG. 5a is a 7-gear transmission with 2 overdrive gears.

The structure of the multiple-gear transmission 10 corresponds essentially to the transmission in FIG. 1a, so that as regards the structure of the multiple-gear transmission 10 reference should be made to the description regarding FIG. 1a. The difference from the transmission in FIG. 1a is that the sun gear 103 and the ring gear 133 of the third planetary gearset PG3 can be coupled by means of the additional, fourth dual shifting element J/K. When the shifting element J is actuated, it connects the sun gear 103 and the ring gear 133 of the third planetary gearset PG3. On the other hand, if the shifting element K is actuated, it connects the sun gear 103 to the housing G. The additional fourth dual shifting element J/K enables the third planetary gearset PG3 to rotate as a block in every gear except the $4^{th}$ forward gear. In the $4^{th}$ forward gear the shifting element D is actuated or closed and the force flow passes via the gear ratio provided by the third planetary gearset PG3. For the third planetary gearset PG3 to rotate as a block the shifting element J is actuated or closed in every gear except the $4^{th}$ forward gear. In the $6^{th}$ forward gear, instead of the third shifting element C it is then possible for the fourth shifting element D to be or remain actuated. The block rotation always produces the gear ratio i=1. When the $4^{th}$ forward gear is needed and for this the shifting element D is closed, the sun gear 103 of the third planetary gearset PG3 must be braked by the shifting element K. Alternatively, the shifting element J can also connect or couple the sun gear 103 of the third planetary gearset PG3 to the carrier 125 or to the ring gear 133 of the third planetary gearset PG3.

The advantage of the embodiment shown in FIG. 5a is that the block rotation of the third planetary gearset PG3 avoids drag losses due to gearwheels that rotate free from load and rotating planetary gearwheels in the third planetary gearset PG3 (planetary gearwheel mounting).

FIG. 5b shows a possible shifting matrix for a transmission according to FIG. 5a. In the shifting matrix shown in FIG. 5b crosses are only entered for those of the shifting elements, i.e. the shifting elements A to F and the clutch K1 and the brake B2, which are needed for the respective forward gears V1 to V7 and are actuated or closed in the gear concerned. The next to last column of the shifting matrix indicates, as examples, the gear ratios i of the engaged forward gears V1 to V7. In addition, the last column of the shifting matrix shows the resulting transmission ratio phi of the forward gear next-lower than the forward gear V1 to V7 concerned.

FIG. 6 shows a transmission according to a sixth embodiment of the present invention.

FIG. 6 shows yet another multiple-gear transmission 10. In this case the multiple-gear transmission is a further variant of the transmission 1 in FIG. 1a. In its structure the multiple-gear transmission 10 corresponds essentially to the transmission according to FIG. 1a, so that as regards the structure of the multiple-gear transmission 10 reference should be made to the description relating to FIG. 1a.

The embodiment shown in FIG. 6 differs from the transmission 1 of FIG. 1a in that instead of the brake B2 as in the transmission in FIG. 1a, a second clutch K2 is provided, which is arranged between the carrier 121 of the first planetary gearset PG1 and the carrier 122 of the second planetary gearset PG2. When the clutch K2 is actuated, it connects the carrier 121 of the first planetary gearset PG1 and the driveshaft ANW or the first transmission shaft GW1 connected rotationally fixed to the carrier 121, to the sun gear 102 of the second planetary gearset PG2.

Instead of passing via the brake B2 as in the transmission 1 of FIG. 1, the force flow through the second partial transmission TG2 can also be connected by means of the additional, second clutch K2 to the sun gear 102 of the second planetary gearset PG2. The clutch K2 connects the driveshaft ANW of the drive engine to an input shaft of the second partial transmission TG2. Compared with a brake B2, the design of the frictional shifting element or second clutch K2 is different. Other torque support factors and other rotational speed differences exist at the frictional shifting element. The shifting scheme for the transmission in FIG. 6 corresponds to the shifting scheme shown in FIG. 1b for the transmission in FIG. 1a. Only, in the transmission of FIG. 6 the clutch K2 is actuated or closed instead of the brake B2.

In a further example embodiment (not shown) of the transmission according to FIG. 6, the second clutch K2 is arranged between the ring gear 132 of the second planetary gearset PG2 and the dual shifting element O/D. Then, there are again other torque support factors and other rotational speed differences at the frictional shifting element.

Likewise, in another example embodiment (not shown) of the transmission according to FIG. 6 the first clutch K1 is arranged between the ring gear 131 of the first planetary gearset PG1 and the sun gear 104 of the fourth planetary gearset PG4, but before the shifting element C (not shown). In this case the first clutch K1 is internal.

Figure 7A:
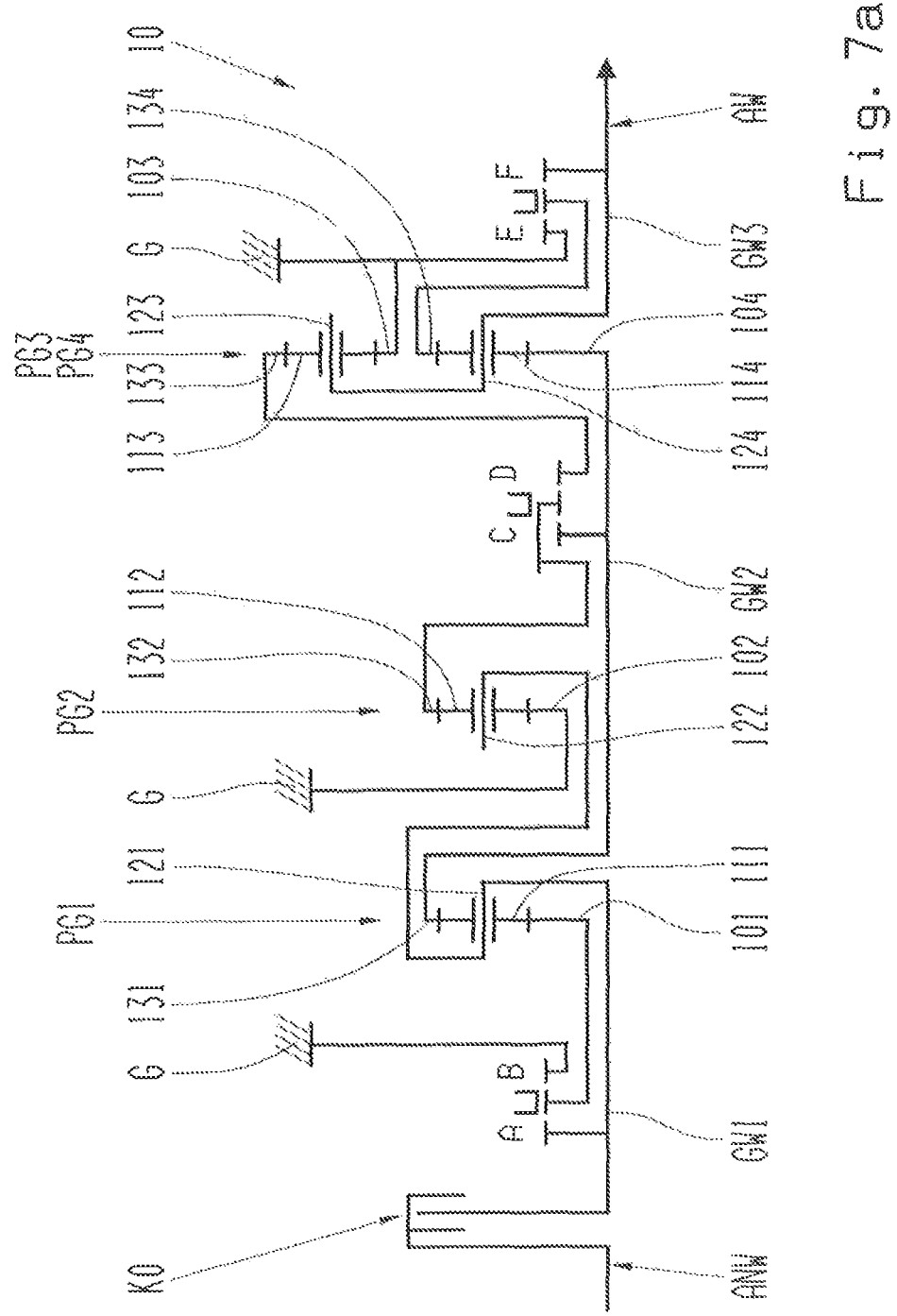
FIG. 7a: A transmission according to a seventh embodiment of the present invention.

FIG. 7a shows a transmission according to a seventh embodiment of the present invention.

In FIG. 7a a multiple-gear transmission 10 in the form of a further variant of the transmission 10 according to FIG. 1 is shown. The structure of the multiple-gear transmission 10 corresponds essentially to the transmission in FIG. 1a, so that as regards the structure of the multiple-gear transmission 1 reference should be made to the description relating to FIGS. 1a to 1c.

In contrast to the multiple-gear transmission of FIG. 1a, however, in the transmission 10 shown in FIG. 7a the two powershift elements, i.e. the clutch K1 and the brake B2 in FIG. 1a or correspondingly the clutch K2 in FIG. 6 are replaced by fixed connections. This produces an automated multiple-gear transmission (AMT) that cannot be powershifted, in which gearshifts can only be carried out with traction force interruption. For example, the transmission 10 shown in FIG. 7a is a 7-gear transmission comprising two overdrive gears.

As shown in FIG. 7a, the sun gear 102 of the second planetary gearset PG2 is connected to the housing G and is thus fixed relative to the housing. Furthermore, in the multiple-gear transmission in FIG. 7a the carrier 122 of the second planetary gearset PG2 is connected to the additional separator clutch K0 when the first shifting element A of the first dual shifting element NB is actuated. In this case, if the additional clutch K0 is also actuated, then the clutch K0 connects the carrier 122 of the second planetary gearset PG2 to the driveshaft ANW. In contrast, if the second shifting element B of the first dual shifting element NB is actuated, then the sun gear 101 of the first planetary gearset PG1 is connected to the housing G and is therefore fixed relative to the housing.

In the transmission of FIG. 7a the additional separator clutch K0 is in the form of a conventional starting clutch. In this case there are no reversing gears. These must be provided by an additional assembly, for example by a combination with a range group having at least one integrated reversing gear.

The embodiment shown in FIG. 7a is an inexpensive variant of the gearset. Furthermore, the efficiency can be increased due to the omission of the shifting elements. In addition the basic gearset can be used as a basis both for a powershift transmission (DCT-like), and also for an automated multiple-gear transmission with traction force interruption.

In a variant (not shown) of the transmission in FIG. 7a, in the third planetary gearset PG3, instead of its sun gear 103 fixed to the housing a combined component consisting of the sun gear 103 of the third planetary gearset PG3 and the ring gear 134 of the fourth planetary gearset PG4 can be used. The advantage of this is that block rotation of the third planetary gearset PG3 is produced when the sixth shifting element F of the third dual shifting element E/F is actuated or closed. In that case there is no bearing loss at the planetary gearwheel 113 of the third planetary gearset PG3. A preparatory background shift of the third dual shifting element E/F is no longer possible, which results in a longer shift duration when shifting from the $4^{th}$ to the $5^{th}$ gear. Thus, in the shifting matrix of the transmission, as shown in FIG. 7c described below, in this variant in order to keep the sun gear 103 of the third planetary gearset PG3 fixed relative to the housing, in the $4^{th}$ gear the fifth shifting element E must therefore remain actuated or closed.

FIG. 7b shows a gear ratio scheme for a transmission as in FIG. 7a.

FIG. 7c shows a shifting matrix for a transmission as in FIG. 7a. In the shifting matrix shown in FIG. 7c, crosses are only entered for those of the shifting elements, i.e. the shifting elements A to F, which are needed in order to obtain the respective forward gears V1 to V7 and are actuated or closed in the gear concerned. In the next to last column of the shifting matrix examples of the gear ratios i of the engaged forward gears V1 to V7 are shown. In addition, the last column of the shifting matrix shows the resulting transmission ratio phi of the gear next-lower than the forward gear V1 to V7 concerned.

FIG. 8a shows a transmission according to an eighth embodiment of the present invention.

In FIG. 8a yet another multiple-gear transmission 10 is shown. In this case the multiple-gear transmission 10 is a further variant of the transmission 1 according to FIG. 1a. In its structure the multiple-gear transmission 10 corresponds essentially to the transmission 10 according to FIG. 7a, so that as regards the structure of the multiple-gear transmission 10 reference should be made to the description regarding FIGS. 7a to 7c and, by derivation, to the description regarding FIGS. 1a to 1c.

The multiple-gear transmission 10 in FIG. 8a differs from the transmission 1 according to FIG. 1a in that the clutch K1 is omitted, and instead of it the separator clutch K0 is provided, as previously in FIG. 7a. The separator clutch K0 serves as a conventional starting clutch and connects the drive engine or internal combustion engine to the driveshaft ANW. In the example embodiment in FIG. 8a, the drive engine is coupled to the first partial transmission TG1 solely by means of the dual shifting element A/B.

Furthermore, the brake B2 in FIG. 1a or the corresponding clutch K2 in FIG. 6 is replaced by an additional shifting element X. When the additional shifting element X is actuated or closed, it connects the driveshaft ANW to the carrier 122 of the second planetary gearset PG2. This results in a coupling of the drive engine to the second partial transmission TG2. In addition, an electric machine EM is provided for powershifting. The traction force is then always supported by the electric machine EM by way of the second partial transmission TG2. During a gearshift in the second partial transmission TG2 the drive engine receives a traction force by way of the first partial transmission TG1. This means that shifts always only take place in alternation between the first partial transmission TG1 and the second partial transmission TG2.

There is no need for a reversing gear or R-gear or reversing gear step, since for driving in reverse the electric machine EM in the forward gear rotates in reverse.

The frictional separator clutch K0 is optional. It can be provided as a starting clutch for when the electric machine EW is too weak or the energy accumulator or electric accumulator of the electric machine EW is insufficiently charged. The separator clutch K0 is opened during transmission synchronization. As with an automated multiple-gear transmission, shifting then takes place in the first partial transmission TG1. The second partial transmission TG2, i.e. the second dual shifting element C/D, is always synchronized by regulating the rotational speed of the electric machine EM.

FIG. 8b shows a gear ratio scheme for a transmission according to FIG. 8a.

FIG. 8b shows by way of example a transmission ratio table for gear ratios of the four planetary gearsets PG1 to PG4 of the transmission 10 according to FIG. 8a. In this, a respective fixed transmission ratio i0 is shown for the planetary gearsets PG1 to PG4, and a respective planetary gearset gear ratio i_PG for the planetary gearsets PG1 to PG4.

In addition, FIG. 8c shows a shifting matrix for a transmission according to FIG. 8a. In the shifting matrix shown in FIG. 8c, crosses are only entered for those of the shifting elements, i.e. the shifting elements A to F and X, which are needed for each of the forward gears V1 to V7 and are actuated or closed in the gear concerned. The next to last column of the shifting matrix shows as examples the gear ratios i of the engaged forward gears V1 to V7. Furthermore, the last column of the shifting matrix shows the resulting transmission ratio phi of the gear next-lower than the forward gear V1 to V7 concerned.

Figure 9A:
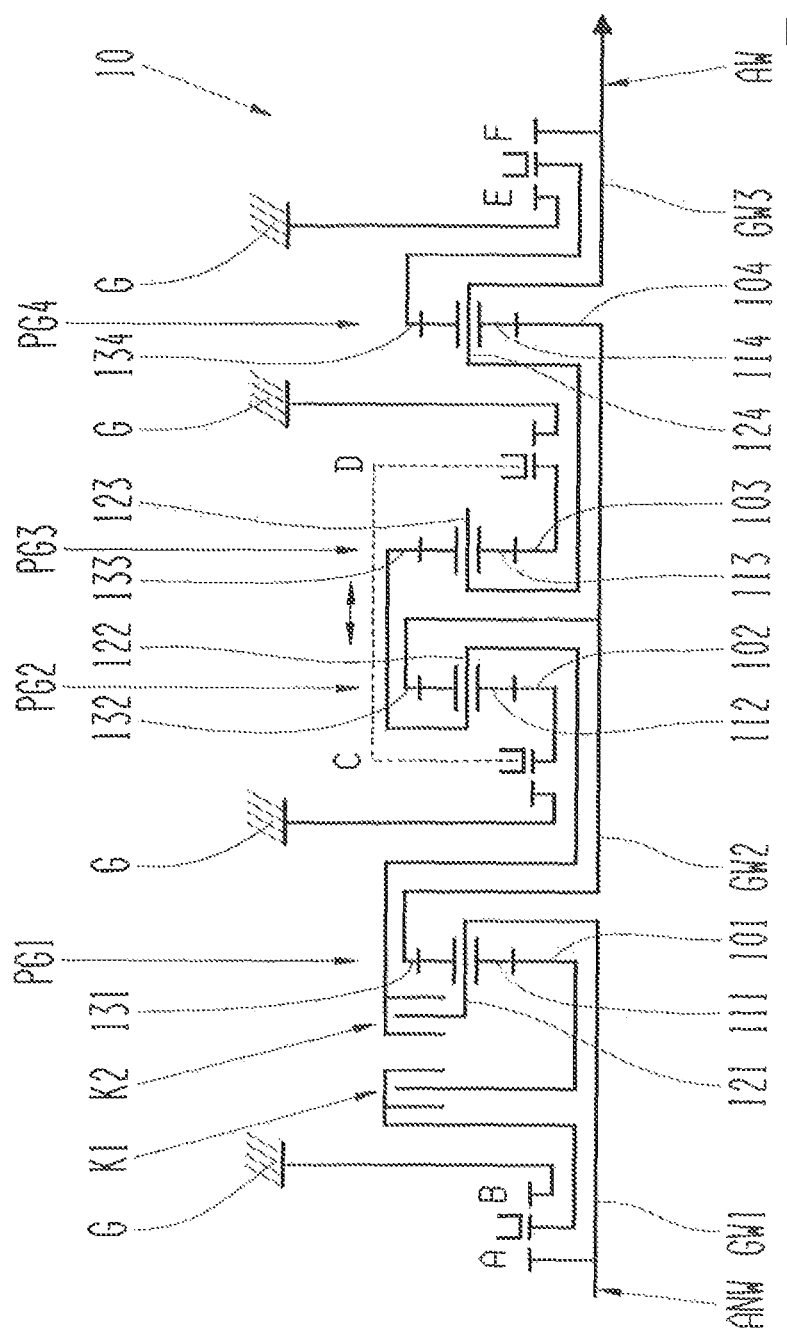
FIG. 9a: A transmission according to a ninth embodiment of the present invention.

FIG. 9a shows a transmission according to a ninth embodiment of the present invention.

FIG. 9a shows a further multiple-gear transmission 10. The multiple-gear transmission 10 is a further variant of the transmission 1 according to FIG. 1a. The structure of the multiple-gear transmission 10 corresponds essentially to that of the transmission in FIG. 1a, so that as regards the structure of the multiple-gear transmission 10 reference should be made to the description regarding FIG. 1. In contrast to the multiple-gear transmission of FIG. 1a, the transmission 1 according to the example embodiment shown in FIG. 9a does not have nested third and fourth planetary gearsets PG3 and PG4. Instead, the third and fourth planetary gearsets PG3 and PG4 are arranged next to one another. Furthermore, the third and fourth shifting elements C and D are not combined in a dual shifting element. In addition, next to the first clutch K1 a second clutch K2 is provided. When the second clutch K2 is actuated or closed, it connects the driveshaft ANW or first transmission shaft GW1, which is connected in a rotationally fixed manner to the carrier 122 of the second planetary gearset PG2, to the ring gear 133 of the third planetary gearset PG3.

When actuated or closed, the third shifting element C connects the sun gear 102 of the second planetary gearset PG2 to the housing G, so that the sun gear 102 is fixed relative to the housing. In turn, when actuated or closed, the shifting element D connects the sun gear 103 of the third planetary gearset PG3 to the housing G, so that the sun gear 103 is fixed relative to the housing.

In all the variants shown, of the 7-gear transmission with two overdrive gears, the second partial transmission TG2 produces a gear ratio $k^1$ which, by way of the fourth planetary gearset PG4 and inter alia by means of the third shifting element C, is used in duplicate. Furthermore, the second partial transmission TG2 produces a gear ratio $k^1$ which acts by virtue of the fourth shifting element D independently of the fourth planetary gearset PG4.

In the variant shown in FIG. 9a, the gear ratio $k^{-1}$ is produced as before by way of the second planetary gearset PG2. In this case the drive input to the second planetary gearset PG2 takes place via the carrier 122 of the second planetary gearset PG2 and its drive output via the ring gear of the second planetary gearset PG2. The sun gear 102 of the second planetary gearset PG2 is connected to the housing G and becomes fixed relative to the housing, by actuating the third shifting element C.

The gear ratio $k^{-1}$ that is independent of the fourth planetary gearset PG4 is produced, in the example embodiment shown in FIG. 9a, exclusively by the third planetary gearset PG3 and no longer by the series connection of the second and third planetary gearsets PG2 and PG3. In this case the drive input to the third planetary gearset PG3 takes place via the ring gear 133 of the PG3 and the drive output via the carrier 123 of the PG3. The sun gear 103 of the third planetary gearset PG3 is connected to the housing G by actuating the fourth shifting element D, and is thus fixed relative to the housing.

The example embodiment shown in FIG. 9a has the advantage that the third planetary gearset PG3 has a quantitatively large fixed transmission ratio i0 and the rotational speed of its planetary gearwheels is therefore lower. Furthermore, the efficiency in the $4^{th}$ forward gear is better since the force flow passes only via the third planetary gearset PG3 and no longer via the second and the third planetary gearsets PG2 and PG3. Nesting of the third and fourth planetary gearsets PG3 and PG4 is not possible because of the size of the fixed transmission ratio 10 of the third planetary gearset PG3.

The third and fourth shifting elements C and D can for example be actuated by a common actuator, as indicated in FIG. 9a by a broken line. Likewise, however, each of the two shifting elements C and D can have an actuator of its own.

In a variant of the example embodiment of FIG. 9a (not shown), the transmission is designed such that the third shifting element C connects the ring gear 132 of the second planetary gearset PG2 to the sun gear 104 of the fourth planetary gearset PG4. The third shifting element C is then internal and not accessible from outside.

In a further variant of the example embodiment of FIG. 9a (not shown), the transmission is designed such that by means of the fourth shifting element D, the carrier 123 of the third planetary gearset PG3 can be connected to the carrier 124 of the fourth planetary gearset PG4. In this case the sun gear 103 of the third planetary gearset PG3 is arranged fixed on the housing.

In a further variant of the embodiment in FIG. 9a (not shown), the transmission is designed such that by means of the fourth shifting element D the carrier 122 of the second planetary gearset PG2 can be connected to the ring gear 133 of the third planetary gearset PG3. In this case the sun gear 103 of the third planetary gearset PG3 is again arranged fixed on the housing.

FIG. 9b shows a transmission ratio scheme for a transmission as in FIG. 9a.

Furthermore, FIG. 9b shows as an example a gear ratio table for gear ratios of the four planetary gearsets PG1 to PG4 in FIG. 9a. This indicates a respective fixed transmission ratio i0 of the first planetary gearsets PG1 to PG4 and a respective gear ratio i_PG of the planetary gearset, for the planetary gearsets PG1 to PG4.

FIG. 9c shows a shifting matrix for a transmission as in FIG. 9a.

FIG. 9c also shows a shifting matrix for a transmission according to FIG. 9a. In the shifting matrix shown in FIG. 9c, crosses are only entered for those of the shifting elements, i.e. the shifting elements A to F and the two clutches K1 and K2, which are needed for the respective forward gears V1 to V7 and are actuated or closed in the gear concerned. The next to last column of the shifting matrix indicates as examples the gear ratios i of the engaged forward gears V1 to V7. In addition, the last column of the shifting matrix indicates the resulting transmission ratio phi of the gear next-lower than the forward gear V1 to V7 concerned.

Figure 10A:
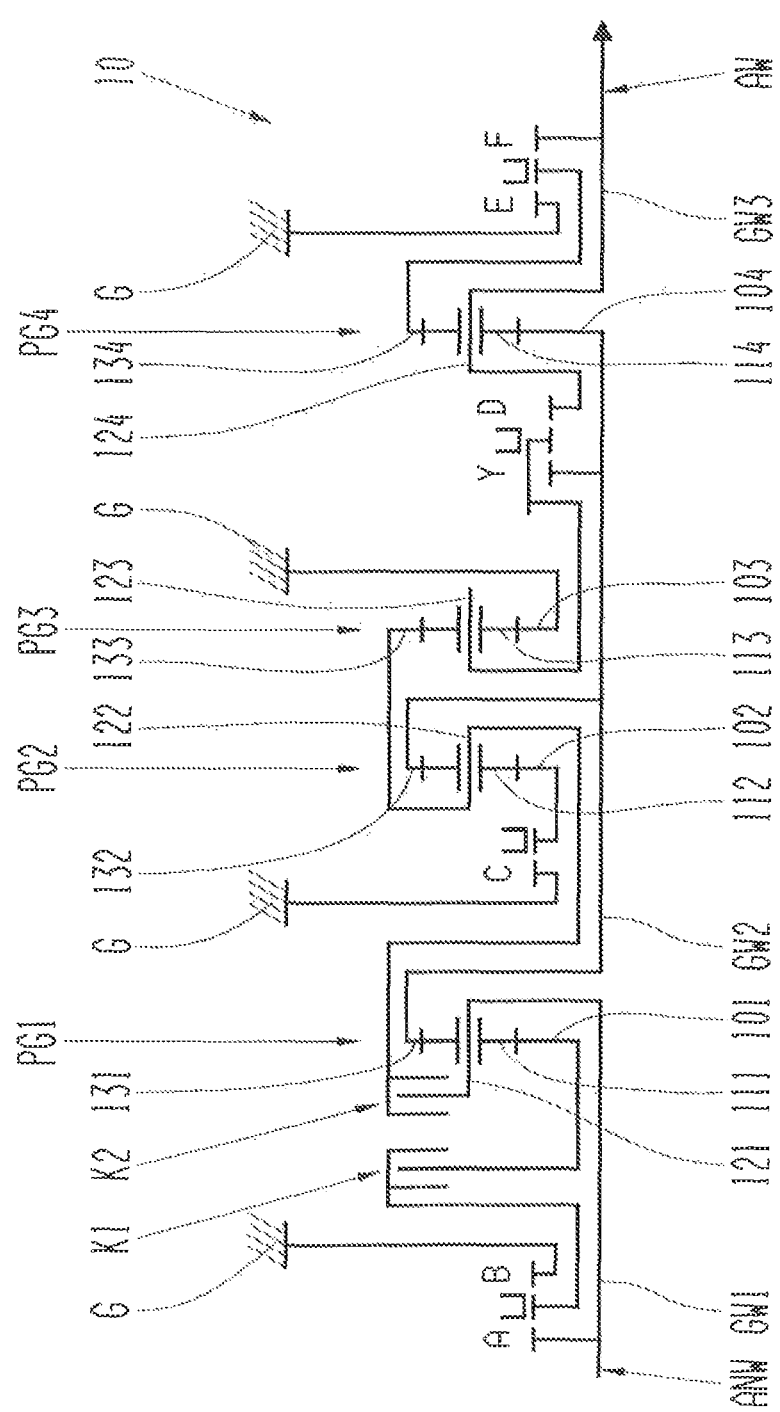
FIG. 10a: A transmission according to a tenth embodiment of the present invention.

FIG. 10a shows a transmission according to a tenth embodiment of the present invention.

FIG. 10a shows a variant of the example embodiment of FIG. 9a. The multiple-gear transmission 10 corresponds in its structure essentially to the transmission in FIG. 9a, so that as regards the structure of the multiple-gear transmission 10 reference should be made to the description relating to FIGS. 9a to 9c and also to the associated description relating to FIGS. 1a to 1c.

The transmission 10 shown in FIG. 10a is an 8-gear transmission with two overdrive gears (2OD). In this case the transmission 10 differs from the transmissions shown in FIG. 9a in that an additional shifting element Y is provided, which is combined with the fourth shifting element D in dual shifting element Y/D. When the shifting element Y is actuated or closed, it connects the carrier 123 of the third planetary gearset PG3 to the second transmission shaft GW2 and the sun gear 104 of the fourth planetary gearset PG4 connected to the second transmission shaft GW2 in a rotationally fixed manner. On the other hand, if the fourth shifting element D is actuated or closed, it connects the carrier 123 of the third planetary gearset PG3 to the carrier 124 of the fourth planetary gearset PG4.

In FIG. 10a, compared with the variant with seven gears, in the second partial transmission TG2 the gear ratio from the original 4$^{th}$ forward gear, which bypasses the fourth planetary gearset PG4, is also used together with the fourth planetary gearset PG4. As described above, for this the shifting element Y connects the carrier 123 of the third planetary gearset PG3 to the sun gear 104 of the fourth planetary gearset PG4. In this way a short gear can be obtained as a new 1' forward gear, as can also be seen from the shifting table in FIG. 10c below.

FIG. 10b shows a transmission ratio scheme for a transmission as in FIG. 10a.

FIG. 10c shows a shifting matrix for a transmission according to FIG. 10a. In the shifting matrix shown in FIG. 10c crosses are only entered for those of the shifting elements, i.e. the shifting elements A to Y and the clutches K1 and K2, which are needed for the respective forward gears V1 to V8 and which are actuated or closed in the gear concerned. The next to last column of the shifting matrix indicates as examples the gear ratios i of the engaged forward gears V1 to V8. In addition, the last column of the shifting matrix shows the resulting gear ratio phi of the gear next-lower than the forward gear V1 to V8 concerned.

Figure 11A:
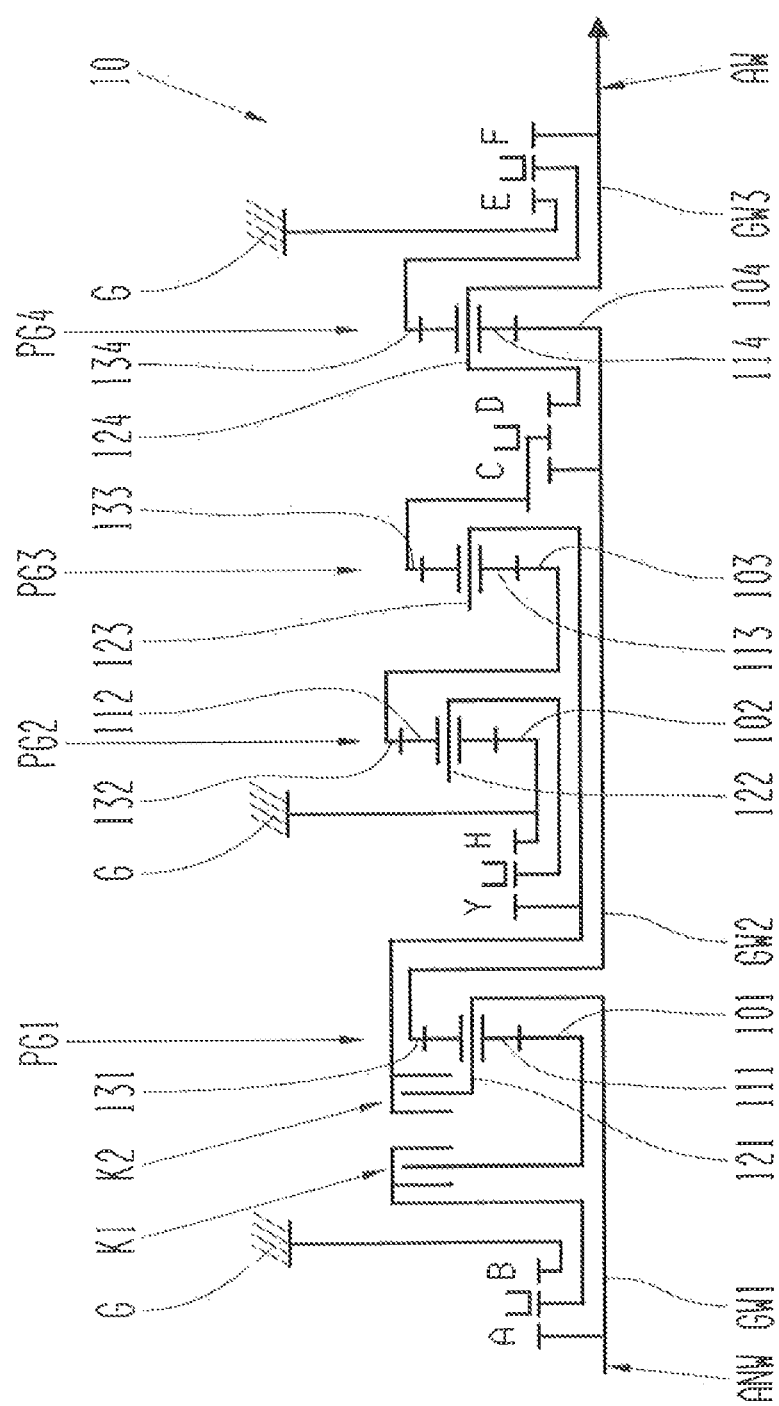
FIG. 11a: A transmission according to an eleventh embodiment of the present invention.

FIG. 11a shows a transmission according to an eleventh embodiment of the present invention.

FIG. 11a shows a variant of the example embodiment of FIG. 10a. The structure of the multiple-gear transmission 10 corresponds essentially to that of the transmission according to FIG. 10a, so that as regards the structure of the multiple-gear transmission 10 reference should be made to the description relating to FIGS. 10a to 10c and also to the associated description relating to FIGS. 1a to 1c.

As in the case of the transmission shown in FIG. 10a, the transmission shown in FIG. 11a is also an 8-gear transmission with two overdrive gears (2OD). The transmission 10, however, differs from that shown in FIG. 10a in that an additional dual shifting element Y/H is provided, which combines the shifting elements Y and H. Furthermore, the third and fourth shifting elements C and D are combined in a second dual shifting element C/D.

In the dual shifting element Y/H, if the shifting element Y is actuated or closed it connects the carrier 123 of the third planetary gearset PG3 to the carrier 122 of the second planetary gearset PG2. In contrast, if the shifting element H is actuated or closed it connects the carrier 122 of the second planetary gearset PG2 to the sun gear 102 of the second planetary gearset PG2, which is fixed on the housing.

In the dual shifting element C/D, if the third shifting element C is actuated or closed it connects the ring gear 133 of the third planetary gearset PG3 to the second transmission shaft GW2 and to the sun gear 104 of the fourth planetary gearset PG4 connected rotationally fixed to the second transmission shaft GW2. In contrast, if the fourth shifting element D is actuated or closed, it connects the ring gear 133 of the third planetary gearset PG3 to the carrier 124 of the fourth planetary gearset PG4.

This variant of the 8-gear transmission with four dual shifting elements A/B, C/D, E/F and Y/H allows further shifting variants for the second partial transmission TG2. The second and third planetary gearsets PG2 and PG3 co-operate so that the gear ratios $k^1$ and $k^{-1}$ can be engaged by means of the shifting elements Y and H. Those ratios can act by way of the fourth planetary gearset PG4 or as gears bypassing the fourth planetary gearset PG4 by way of the third and fourth shifting elements C and D.

FIG. 11b shows a transmission ratio scheme for a transmission as in FIG. 11a. In addition, FIG. 11c shows a shifting matrix for a transmission according to FIG. 11a. In the shifting matrix shown in FIG. 11c crosses are only entered for those of the shifting elements, i.e. the shifting elements A to H and the clutches K1 and K2, which are needed for the respective forward gears V1 to V8 and are actuated or closed in the gear concerned. The next to last column of the shifting matrix indicates as examples the gear ratios i of the engaged forward gears V1 to V8. Furthermore, the last column of the shifting matrix indicates the resulting transmission ratio phi of the gear next-lower than the forward gear V1 to V8 concerned.

FIG. 12a shows a transmission according to a twelfth embodiment of the present invention.

FIG. 12a shows a variant of a transmission according to FIG. 10a. The structure of the multiple-gear transmission 1 corresponds essentially to the transmission shown in FIG. 10a, so that as regards the structure of the multiple-gear transmission 1 reference should be made to the description relating to FIGS. 10a to 10c and also to the associated description relating to FIGS. 1a to 1c.

The transmission shown in FIG. 12a is again an 8-gear transmission with two overdrive gears (2OD), as are the transmissions according to FIGS. 10a and 11a. The transmission 1 in FIG. 12a differs from the one shown in FIG. 10a in that instead of four, only three planetary gearsets PG1, PG2, PG4 are provided. In the example embodiment shown in FIG. 12a these are the first, second and fourth planetary gearsets PG1, PG2 and PG4. Moreover, the third and fourth shifting elements C and D are combined in a dual shifting element, and three additional shifting elements Y, H and I are provided, of which the two shifting elements Y and H are combined in a dual shifting element Y/H. When the third shifting element C is closed, it connects the clutch K2 to the ring gear 132 of the second planetary gearset PG2. On the other hand, when the fourth shifting element D is actuated or closed, the clutch K2 is connected to the carrier 122 of the second planetary gearset PG2. In turn, the clutch K2 is connected to the driveshaft ANW when it is closed or actuated. When the shifting element Y is closed, it connects the ring gear 132 of the second planetary gearset PG2 to the second transmission shaft GW2 and to the sun gear 104 of the fourth planetary gearset PG4 connected in a rotationally fixed manner to the second transmission shaft GW2. On the other hand, when the shifting element H is closed it connects the carrier 122 of the second planetary gearset PG2 to the second transmission shaft GW2 and via that to the sun gear 104 of the fourth planetary gearset PG4. Furthermore, when the shifting element I is closed it connects the carrier 122 of the second planetary gearset PG2 to the carrier 124 of the fourth planetary gearset PG4.

The variant of an 8-gear transmission shown in FIG. 12a provides further shifting variants for the second partial transmission TG2. In this case, by virtue of the shifting elements C, D, Y, H and I the second planetary gearset PG2 is used for both of the necessary transmission ratios $k^1$ and $k^{-1}$. The transmission ratio $k^1$ is produced when the ring gear 132 of the second planetary gearset PG2 is driven by closing the third shifting element C. The drive output then takes place via the carrier 122 of the second planetary gearset PG2. The sun gear 102 of the second planetary gearset PG2 is fixed on the housing. In turn, the transmission ratio $k^{-1}$ is produced when the carrier 122 of the second planetary gearset PG2 is driven, in that the fourth shifting element D is closed. The drive output then takes place via the ring gear 132 of the second planetary gearset PG2. The sun gear 102 of the second planetary gearset PG2 is fixed on the housing. These transmission ratios can be activated by means of the shifting elements Y and H via the fourth planetary gearset PG4, or as a bypass gear of the fourth planetary gearset PG4 by means of the shifting element I.

The advantage of the example embodiment in FIG. 12a is that it contains one less planetary gearset. Instead several shifting elements are provided, of which the shifting elements Y and H are positioned internally.

As the powershifting element for the second partial transmission TG2, instead of the second clutch K2 as shown in FIG. 12a a brake B2 (not shown) can also be provided for the sun gear 102 of the second planetary gearset PG2.

In a variant of the transmission according to FIG. 12a (not shown), the shifting element H for the $1^{st}$ forward gear is omitted so that a 7-gear transmission is produced. The shifting scheme shown in FIG. 12c below remains the same except in that there is no $1^{st}$ forward gear. The two shifting elements Y and I of the transmission according to FIG. 12a can each be actuated by an actuator of its own or, for example, by only one common actuator, since they are never actuated or closed at the same time.

FIG. 12b shows a transmission ratio scheme for a transmission as in FIG. 12a.

In FIG. 12c a shifting matrix for a transmission as in FIG. 12a is shown. In the shifting matrix shown in FIG. 12c crosses are only entered for those of the shifting elements, i.e. the shifting elements A to I and the two clutches K1 and K2, which are needed for the respective forward gears V1 to V8 and are actuated or closed in the gear concerned. The next to last column of the shifting matrix indicates as examples the gear ratios i of the engaged forward gears V1 to V8. In addition, the last column of the shifting matrix shows the resulting transmission ratio phi of the gear next-lower than the forward gear V1 to V8 concerned.

Figure 13A:
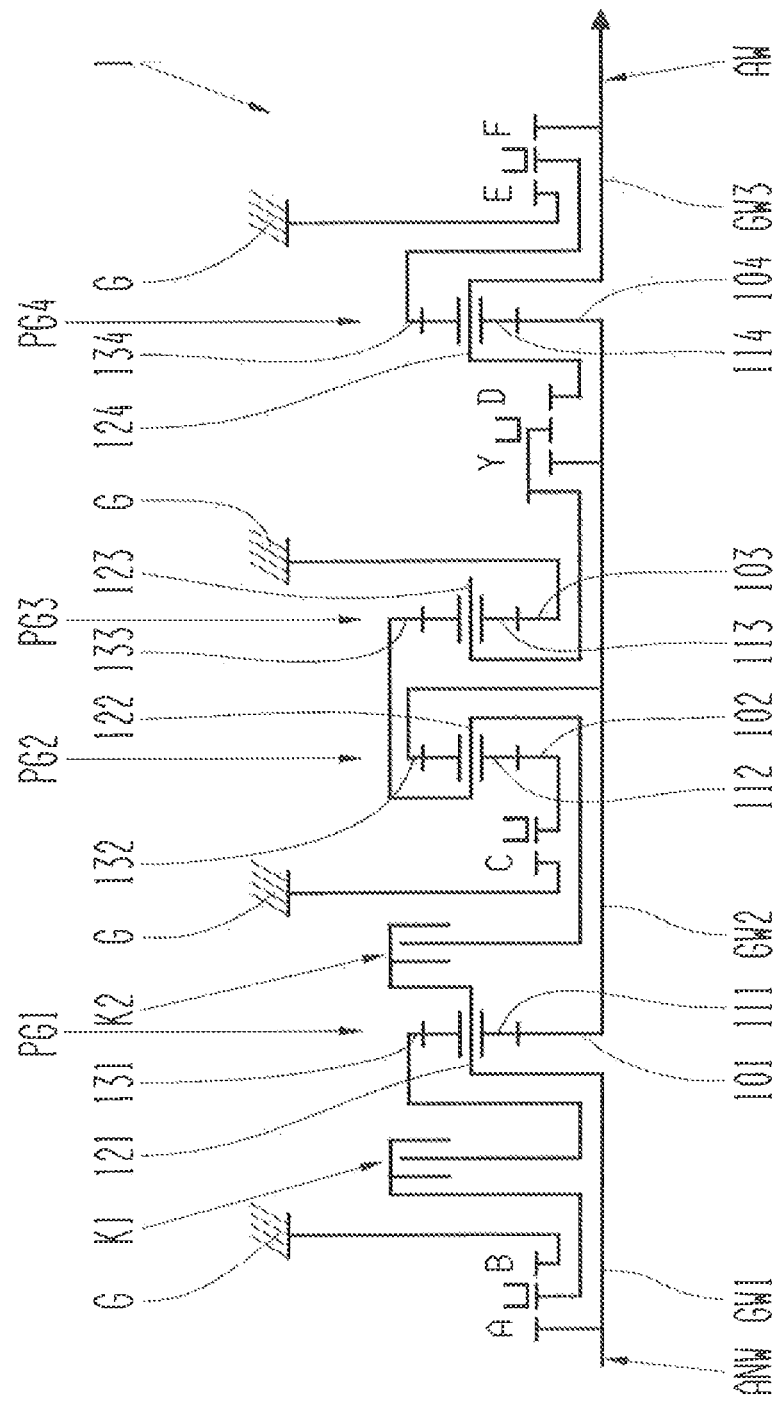
FIG. 13a: A transmission according to a thirteenth embodiment of the present invention.

FIG. 13a shows a transmission according to a thirteenth embodiment of the present invention.

FIG. 13a shows a variant of a transmission according to FIG. 10a. The structure of this multiple-gear transmission 1 corresponds essentially to that of the transmission in FIG. 10a, so that as regards the structure of the multiple-gear transmission 1 reference should be made to the description relating to FIGS. 10a to 10c and also to the associated description relating to FIGS. 1a to 1c.

The transmission shown in FIG. 13a is also an 8-gear transmission with two overdrive gears (2OD), as are those according to FIGS. 10a, 11a and 12a. This transmission 1 differs from the transmission shown in FIG. 10a in that when the second clutch K2 is actuated or closed, it connects the carrier 121 of the first planetary gearset PG1 to the carrier 122 of the second planetary gearset PG2. On the other hand, when the first clutch K1 is actuated or closed it connects the ring gear 131 of the first planetary gearset PG1 to the first dual shifting element NB at the transmission input.

By virtue of the change in the way the first planetary gearset PG1 is connected, a larger double gear interval $k^{-2}$ can be produced. In this case the drive input takes place via the carrier 121 of the first planetary gearset PG1 and the drive output via the sun gear 101 of the first planetary gearset PG1. The ring gear 131 of the first planetary gearset PG1 is then fixed relative to the housing, since it is connected to the housing G by the actuated, second shifting element B. This modified connection mode of the first planetary gearset PG1 can also be combined with the 7-gear transmission variants described herein.

FIG. 13b shows a transmission ratio scheme for a transmission as in FIG. 13a.

In FIG. 13c a shifting matrix for a transmission as in FIG. 13a is shown. In the shifting matrix shown in FIG. 13c crosses are only entered for those of the shifting elements, i.e. the shifting elements A to G and the clutches K1 and K2, which are needed for the respective forward gears V1 to V8 and are actuated or closed in the gear concerned. The next to last column of the shifting matrix indicates as examples the gear ratios i of the engaged forward gears V1 to V8. In addition, the last column of the shifting matrix shows the resulting transmission ratio phi of the gear next-lower than the forward gear V1 to V8 concerned.

Figure 14A:
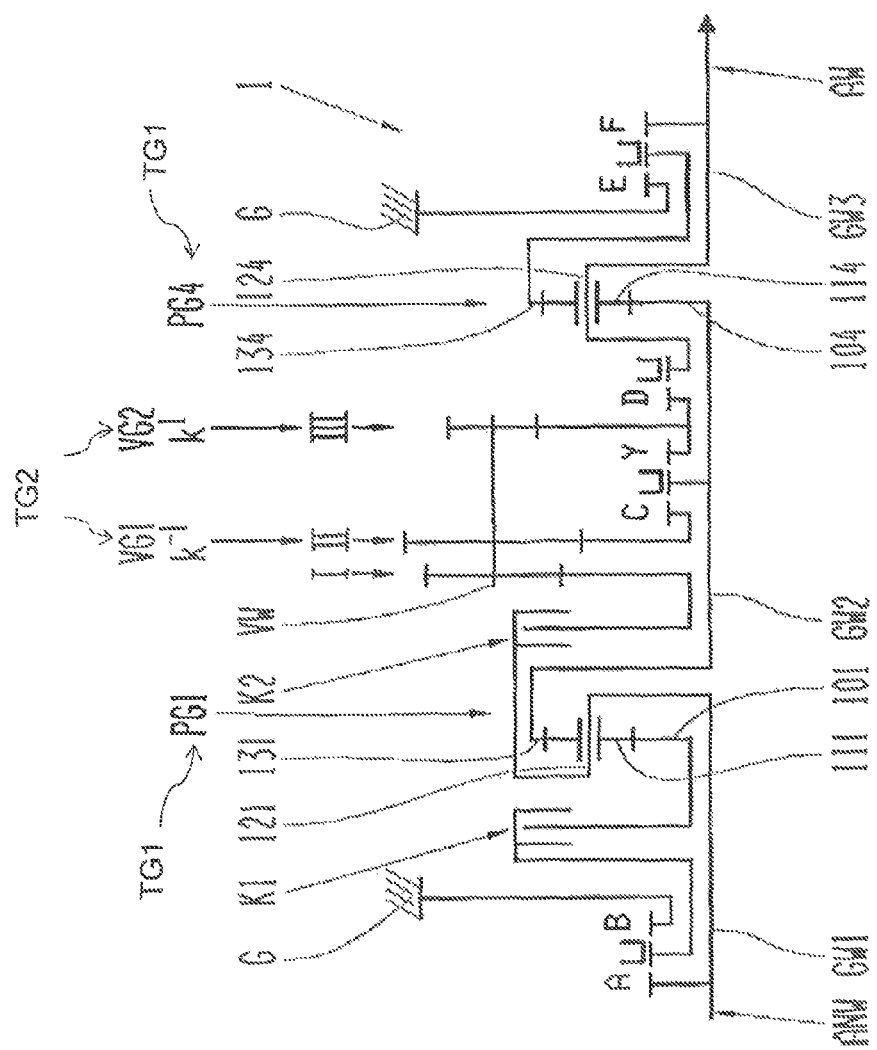
FIG. 14a: A transmission according to a fourteenth embodiment of the present invention.

FIG. 14a shows a transmission according to a fourteenth embodiment of the present invention.

FIG. 14a shows still another variant of a transmission according to FIG. 10a. The structure of this multiple-gear transmission 1 corresponds essentially to that of the transmission in FIG. 10a, so that as regards the structure of the multiple-gear transmission 1 reference should be made to the description relating to FIGS. 10a to 10c and also to the description relating to FIGS. 1a to 1c.

The transmission 1 shown in FIG. 14a is again an 8-gear transmission with two overdrive gears (2OD), as are those according to FIGS. 10a to 13a. The transmission 1 differs from the transmission of FIG. 10a in that there are only two planetary gearsets, in this case the first and fourth planetary gearsets PG1 and PG4. In contrast, the second and third planetary gearsets PG2 and PG3 are omitted. In addition an intermediate gear system is provided, which has a countershaft VW1 and three gearwheel planes, in particular formed as spur gear stages I, II, III.

The intermediate gear system provides gear ratios of $k^{-1}$ and $k^1$. The transmission shafts GW1, GW2, GW3 can be brought into driving connection with one another selectively by means of the wheel planes I, II and III and seven shifting elements A, B, C, D, E, F and Y, as well as the clutches K1 and K2 as further shifting elements. When the clutches K1 and K2 and the first shifting element A are actuated or closed, the first wheel plane I is connected to the driveshaft ANW and the first transmission shaft GW1. The second wheel plane II can be connected, by actuating or closing the third shifting element C, to the second transmission shaft GW2 and hence to the ring gear 131 of the first planetary gearset PG1 connected rotationally fixed to the second transmission shaft GW2. In turn, if the fourth shifting element D is actuated, it connects the third wheel plane III to the carrier 124 of the fourth planetary gearset PG4. On the other hand, if the shifting element Y is actuated it connects the third wheel plane III to the second transmission shaft GW2 and the sun gear 104 of the fourth planetary gearset PG4 connected rotationally fixed thereto.

In the example embodiment shown in FIG. 14a the second partial transmission TG2 is realized by an intermediate gear system configuration. The transmission ratios $k^{-1}$ and $k^1$ (in each case a simple gear interval) previously provided by the second and third planetary gearsets PG2 and PG3 are now realized by two wheel planes in the form of the intermediate gear system. The advantage is that in this way two planetary gearsets, here the second and third planetary gearsets PG2 and PG3, are omitted. Moreover, the shifting elements C, D and Y can be in the form of conventional shifting elements. This means that a central transmission element is connected to a neighboring unit on its left or right. Space can therefore be saved.

The intermediate gear system VG can also be designed in a configuration with two countershafts. In that case the intermediate gear system VG in FIG. 14a is correspondingly mirrored downward. The power division is similar to that of a planetary transmission with a fixed carrier. This has the advantage of balancing the radial forces on the main shaft.

In the transmission shown in FIG. 14a, a reversing gear (not shown) can be added as an additional wheel plane with a reversing wheel.

FIG. 14b shows a transmission ratio scheme for a transmission as in FIG. 14a.

Furthermore, FIG. 14b shows a transmission ratio table for transmission ratios of the two planetary gearsets PG1 and PG4 of the transmission according to FIG. 14a. In this, a respective fixed transmission ratio i0 is indicated for the planetary gearsets PG1 and PG4. In addition, for the intermediate gear system the transmission ratios of the intermediate gear systems iVG1 and iVG2 are shown.

FIG. 14c shows a shifting matrix for a transmission as in FIG. 14a.

FIG. 14c also shows a shifting matrix for a transmission according to FIG. 14a. In the shifting matrix shown in FIG. 14c crosses are only entered for those of the shifting elements, i.e. the shifting elements A to Y and the clutches K1 and K2, which are needed for the respective forward gears V1 to V8 and are actuated or closed in the gear concerned. The next to last column of the shifting matrix shows as examples the gear ratios i of the engaged forward gears V1 to V8. In addition, the last column of the shifting matrix indicates the resulting transmission ratio phi of the gear next-lower to the forward gear V1 to V8 concerned.

Figure 15:
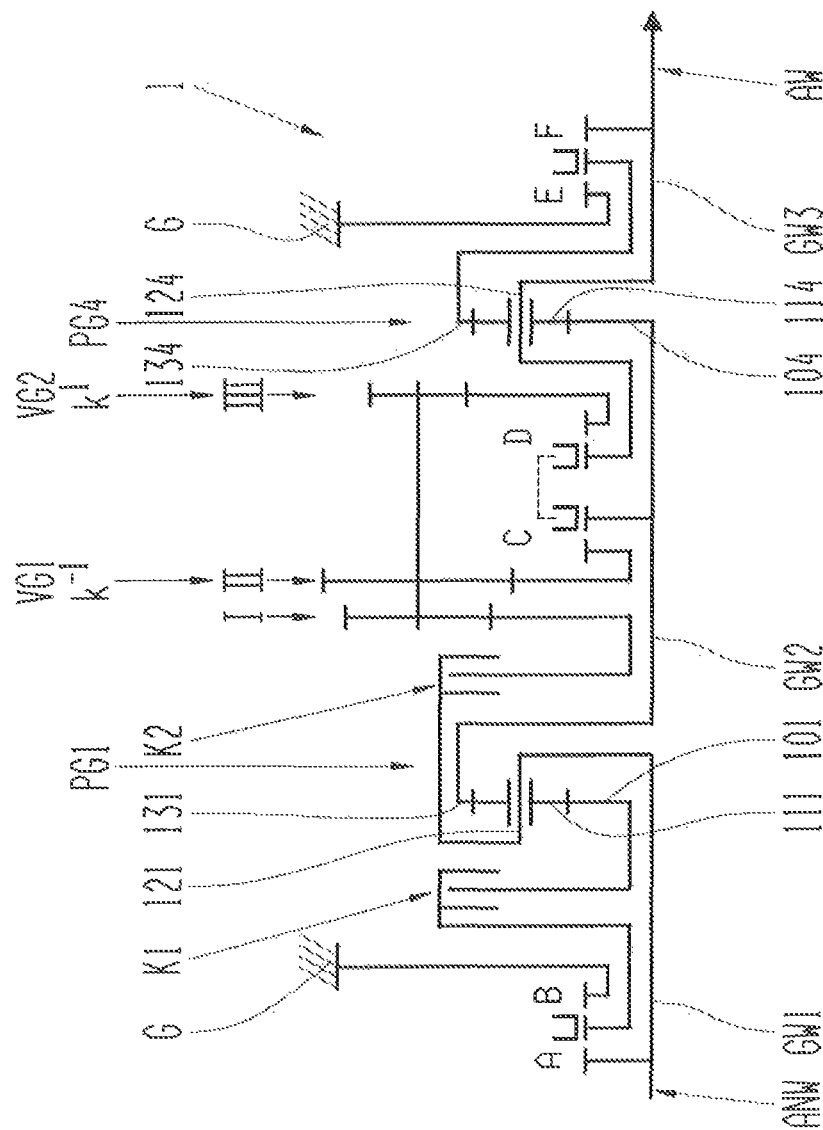
FIG. 15: A transmission according to a fifteenth embodiment of the present invention.

FIG. 15 shows a transmission according to a fifteenth embodiment of the present invention.

FIG. 15 shows yet another variant of the multiple-gear transmission according to FIG. 1a. The structure of the multiple-gear transmission 1 corresponds essentially to that of the transmission in FIG. 1a, so that as regards the structure of the multiple-gear transmission 1 reference should be made to the description relating to FIGS. 1a to 1c.

The transmission 1 shown in FIG. 15 is a 7-gear transmission comprising two overdrive gears in mixed form, i.e. it has a planetary and an intermediate gear system structure. The transmission 1 differs from the transmission according to FIG. 1a in that there are only two planetary gearsets, in this case the first and fourth planetary gearsets PG1 and PG4. In contrast, the second and third planetary gearsets PG2 and PG3 are omitted. Instead, an intermediate gear system with a countershaft and three gearwheel planes I, II and III are provided.

The intermediate gear system provides gear ratios $k^{-1}$ and $k^1$. The transmission shafts GW1, GW2, GW3 can be brought into driving connection with one another selectively by means of the wheel planes I, II, III and six shifting elements A, B, C, D, E and F, as well as the clutches K1 and K2 as further shifting elements. When the clutches K1 and K2 and the shifting element A are actuated or closed, the first wheel plane I is connected to the driveshaft ANW and the first transmission shaft GW1. By actuating or closing the third shifting element C, the second wheel plane II can be connected to the second transmission shaft GW2 and hence to the ring gear 131 of the first planetary gearset PG1 which is connected rotationally fixed to the second transmission shaft GW2. On the other hand, if the fourth shifting element D is actuated, it connects the third wheel plane III to the carrier 124 of the fourth planetary gearset PG4.

In the transmission 1 in FIG. 15 the omission of the shifting element Y for the $1^{st}$ forward gear results in a 7-gear variant. The shifting scheme remains the same, except only that the $1^{st}$ forward gear is absent. In this case, the third and fourth shifting elements C and D can for example be actuated by only one actuator, since they are never closed at the same time.

In the transmission 1 in FIG. 15, if the connectability so permits, a minus planetary gearset can be replaced by a plus planetary gearset (not shown), with corresponding connection, i.e. the carrier and ring gear are exchanged in order to obtain a similar desired gear ratio.

In a further variant of the transmission according to FIG. 15, the two powershift elements K1 and K2 or B2 can be omitted, as in the variant with the automated multiple-gear transmission in FIG. 7a. For this, the shifting elements A/B and C/D are then made as powershift elements of the variant with 7 forward gears and two overdrive gears. This results in a powershift transmission with four powershift elements and a conjointly used planetary gearset group PG4, which with interlock-type shifting elements E/F can be preselected when free from load.

In summary the present invention offers, among others, the advantage that the transmission has a compact structure. Moreover, the transmission has a good range of gear ratios, low inertial masses and a high power density. Furthermore, the present invention provides a large number of gears.

Although the present invention has been described above with reference to preferred example embodiments, it is not limited to them but can be modified in many ways.

INDEXES 1, 10 Transmission
GW1, GW2, GW3, GW4 Transmission shaft
ANW Drive input shaft
AW Drive output shaft
G Housing
PG1, PG2, PG3, PG4, PG5, PG6 Planetary gearset
101, 102, 103, 10-4, 105, 106 Sun gear
111, 112, 113, 114, 115, 116 Planetary gearwheel
121, 122, 123, 124, 125, 126 Carrier/Planetary carrier
131, 132, 133, 134, 135, 136 Ring gear
I, II, III Spur gear stage
i0 Fixed transmission ratio
i_PG Transmission ratio of the planetary gearset
iVG1, iVG2 Transmission ratio of the intermediate gear system
k Gear interval
EM Electric machine
A, B, C, D, E, F, H, I, X, Y Shifting element
B2 Brake
K1, K2, K0 Clutch
V1, V2, V3, V4, V5, V6, V7, V8, V9 V10, V11, V12, V13. V14 Forward gear
R1, R2, R3, R4, R5, R6, R7 Reversing gear

The invention claimed is:

1. A transmission (1), for a motor vehicle, the transmission (1) comprising;
a housing (G),
a drive input shaft (AN),
a drive output shaft (AW),
a plurality of shifting elements (A to Y) including at least a first shifting element (E), a second shifting element (F), and a third shifting element (B, K1),
a first partial transmission (TG1) being formed by at least first and second planetary gearsets (PG1, PG4),
a third planetary gearset (PG2) and a fourth planetary gearset (PG3),
a second partial transmission (TG2),
being formed by at least the second planetary gearset (PG4) together with at least one further planetary gearset or one intermediate gear system such that the second planetary gearset (PG4) acts as a range group used in common by both of the first and the second partial transmissions (TG1 ,TG2),
the first arid the second planetary gearsets (PG1, PG4) each comprise a sun gear (101, 104), at least one planetary gearwheel (111, 114), a planetary carrier (121, 124) and a ring gear (131, 134),
the carrier (121) of the first planetary gearset (PG1) being connected in a rotationally fixed manner to the drive input shaft (GW1, AN),
the carrier (124) of the second planetary gearset (PG4) being directly connected to the drive output shaft (AW),
the ring gear (134) of the second planetary gearset (PG4) being directly connectable to the housing (G) by the first shifting element (E),
the ring gear (134) of the second planetary gearset (PG4) being directly connectable to the carrier (124) of the second planetary gearset (PG4) and the drive output shaft (AW) solely by engagement of only the second shifting element (F),
the transmission further comprising either:
a first combination in which the ring gear (131) of the first planetary gearset (PG1) being rotationally fixedly connected to the sun gear (104) of the second planetary gearset (PG4) and the sun gear (101) of the first planetary gearset (PG1) being connectable by at least the third shifting element (B, K1) to the housing (G), or
a second combination in which the sun gear (101) of the first planetary gearset (PG1) being rotationally fixedly connected to the sun gear (104) of the second planetary gearset (PG4) and the ring gear (131) of the first planetary gearset (PG1) being connectable by at least the third shifting element (B, K1) fixed to the housing (G), and
a majority of the plurality of shifting elements (A, V, R, E, F, B, KO, K1) are arranged in the housing (G) so as to be accessible from outside the transmission.

2. The transmission according to claim 1, wherein the transmission has the first combination, and the transmission further comprises at least one further planetary gearset (PG2, PG3, PG5, PG6) such that the transmission further comprises at least one of:
a first arrangement in which at least two of the first, the second and
the third planetary gearsets (PG1, PG2, PG3, PG4, PG5, PG6) are geometrically arranged, one behind another, in the transmission (1), and
a second arrangement in which at least two of the second, the third, the fourth, a fifth and a sixth planetary gearsets (PG3, PG4; PG5, PG6) are arranged, nested one inside another, such that either:
the second planetary gearset (PG4) is arranged inside the fourth planetary gearset (PG3), or
the fifth planetary gearset (PG5) is arranged inside the sixth planetary gearset (PG6).

3. The transmission according to claim 1, wherein the transmission has the first combination,
the third planetary gearset (PG2) is arranged either between the first and the second planetary gearsets (PG1, PG4) or between the first and the fourth planetary gearsets (PG1, PG3), and
a sun gear (102) of the third planetary gearset (PG2) is either connected to the housing (G) or is connectable to the housing (G) by a fourth shifting element (B2, C).

4. The transmission according to claim 1, wherein the transmission has the first combination, and the transmission further includes a fourth shifting element (B2, C) which is either a frictional brake (B2) or an interlocking shifting element (C).

5. The transmission according to claim 2, wherein a carrier (122) of the third planetary gearset (PG2) is either connected to the carrier (121) of the first planetary gearset (PG1) in a rotationally fixed manner, or is connectable to the carrier (121) of the first planetary gearset (PG1) by at least a fourth shifting element (K2, X, Y, D).

6. The transmission according to claim 5, wherein the transmission further comprises an electric machine (EM) for actuating the fifth shifting element (K2, X, Y, D).

7. The transmission according to claim 2, wherein a sun gear (103) of the fourth planetary gearset (PG3) is at least one of:
either fixedly connected to the housing (G) or is fixedly connectable relative to the housing (G) by a fourth shifting element (K, D, C), and
either connectable by a fifth shifting element (J) to a ring gear (133) of the fourth planetary gearset (PG3) or is rotationally fixedly connected to a ring gear (132) of the third planetary gearset (PG2).

8. The transmission according to claim 2, wherein a carrier (123) of the fourth planetary gearset (PG3) is at least one of:

either rotationally fixedly connected to the carrier (124) of the second planetary gearset (PG4) or connectable to the carrier (124) of the second planetary gearset (PG4) by a fourth shifting element (D), and connectable to the carrier (121) of the first planetary gearset (PG1) by an additional shifting element (K2).

9. The transmission according to claim 2, wherein the fifth planetary gearset (PG5) and the sixth planetary gearset (PG6) are arranged in a nested manner and form a reversing gear group for provision of at least one reversing gear (R1, R2, R3, R4, R5, R6, R7), the reversing gear group is arranged at an output of the transmission (1), a sun gear (105) of the fifth planetary gearset (PG5) is connected in a rotationally fixed manner to the carrier (124) of the second planetary gearset (PG4) and a carrier (125) of the fifth planetary gearset (PG5) is fixedly connectable to the housing (G) by a shifting element (R) for a first reversing gear, and a sun gear (106) of the sixth planetary gearset (PG6) is fixedly connectable to the housing (G) by another shifting element (L) and is connectable to the carrier (125) of the fifth planetary gearset (PG5) by a further shifting element (H).

10. The transmission according to claim 2, wherein the fifth planetary gearset (PG5) is arranged at an input of the transmission (1) and a sun gear (105) of the fifth planetary gearset (PG5) is connected, in a rotationally fixed manner, to the drive input shaft (AN), and a carrier (125) of the fifth planetary gearset (PG5) is either:

fixedly connectably to the housing (G) by an additional shifting element (R) to provide at least one reversing gear (R1, R2, R3, R4, R5, R6, R7), or connectable to the drive input shaft (AN) by a further shifting element (V) to provide at least one forward gear (V1, V2, V3, V4, V5, V6, V7, V8, V9, V10, V11, V12, V13, V14).

11. The transmission according to claim 1, wherein an intermediate gear system (VG3) forms a part of the second partial transmission (TG2), and the intermediate gear system (VG3) comprises at least one countershaft (VW1) and at least two wheel planes (I, II, III).

12. The transmission according to claim 1, wherein a separator clutch (KO) is provided as a starting clutch for connecting a drive engine to the drive input shaft (GW1) of the transmission (1).

13. The transmission according to claim 1, wherein by the first shifting element, the second shifting element, the third shifting element and six additional shifting elements (A, B, C, D, E, F, R, H, L) and at least two powershift elements (K1, 82) and the first planetary gearset, the second planetary gearset and four additional planetary gearsets (PG1, PG2, PG3, PG4, PG3, PG6), at least 14 forward gears (V1 to V14) and at least seven reversing gears (R1 to R7) can be implemented by the transmission.

14. The motor vehicle having the transmission according to claim 1, wherein all of the shifting elements (E, F, B, K1) are arranged in the housing (G) so as to be accessible from the outside.

15. The transmission according to claim 1, the transmission having the second combination, the transmission further comprising:

the third planetary gearset (PG2) is arranged between the first and the fourth planetary gearsets (PG1, PG3)

a sun gear (102) of the third planetary gearset (PG2) is connectable to the housing (G) by a fourth shifting element (B2, C);

a sun gear (103) of the fourth planetary gearset (PG3) is fixedly connected to the housing (G); and a fourth shifting element (K2, X, Y. D) for connecting either of:

a carrier (122) of the third planetary gearset (PG2) to the carrier (121) of the first planetary gearset (PG1) by at least the fourth shifting element (K2, X, Y, D); or a carrier (123) of the fourth planetary gearset (PG3) to the carrier (124) of the second planetary gearset (PG4) by at least the fourth shifting element (K2, X, Y, D).

16. A transmission (1), for a motor vehicle, the transmission (1) comprising a housing (G), a drive input shaft (AN), a drive output shaft (AW), a plurality of shifting elements (A to Y) including at least a first shifting element (E), a second shifting element (F), and a third shifting element (B, K1), at least first and second planetary gearsets (PG1, PG4) in which the first and the second planetary gearsets (PG1, PG4) each comprise a sun gear (101, 104), at least one planetary gearwheel (111, 114), a planetary carrier (121, 124) and a ring gear (131, 134), the carrier (121) of the first. planetary gearset (PG1) being connected in a rotationally fixed manner to the drive input shaft (GW1, AN), the carrier (124) of the second planetary gearset (PG4) being directly connected to the drive output shaft (AW), the ring gear (134) of the second planetary gearset (PG4) being directly connectable to the housing (G) by the first shifting element (E), the ring gear (134) of the second planetary gearset (PG4) being directly connectable to the carrier (124) of the second planetary gearset (PG4) and the drive output shaft (AW) solely by engagement of only the second shifting element (F), the transmission further comprising either:

a first combination in which the ring gear (131) of the first planetary gearset (PG1) being rotationally fixedly connected to the sun gear (104) of the second planetary gearset (PG4) and the sun gear (101) of the first planetary gearset (PG1) being connectable by at least the third shifting element (B, K1) to the housing (G), or a second combination in which the sun clear (101) of the first planetary gearset (PG1) being rotationally fixedly connected to the sun dear (104) of the second planetary gearset (PG4) and the ring gear (131) of the first planetary gearset (PG1) being connectable by at least the third shifting element (B, K1) fixed to the housing (G), and a majority of the plurality of shifting elements (A, V, R, E, F, B, KO, K1) are arranged in the housing (G) so as to be accessible from outside, wherein the first planetary gearset (PG1) and the second planetary gearset (PG4) form a first partial transmission (TG1), and the second planetary gearset (PG4) together with a third planetary gearset (PG2) and a fourth planetary gearset (PG3) form a second partial transmission (TG2).

17. A motor vehicle having a transmission comprising:

a housing (G), a drive input shaft (AN), a drive output shaft (AW), a plurality of shifting elements (A to Y) including at least a first shifting element E), a second shifting element (F), and a third shifting element (B, K1), a first partial transmission (TG1) being formed by at least first and second planetary gearsets (PG1, PG4), a third planetary gearset (PG2) and a fourth planetary gearset (PG3), a second partial transmission(TG2), being formed at least the second planetary gearset (PG4) together with at least one further planetary gearset or one intermediate gear system such that the second planetary gearset (PG4) acts as a range group used in common by both of the first and the second partial transmissions (TG1, TG2), the first and the second planetary gearsets (PG1, PG4) each comprise a sun gear (101, 104), at least one planetary gearwheel (111, 114), a planetary carrier (121, 124) and a ring gear (131, 134), the carrier (121) of the first planetary gearset (PG1) being connected in a rotationally fixed manner to the drive input shaft (GW1, AN), the carrier (124) of the second planetary gearset (PG4) being directly connectable to the drive output shaft (AW), the ring gear (134) of the second planetary gearset (PG4) being directly connectable to the housing (G) by the first shifting element (E), the ring gear (134) of the second planetary gearset (PG4) also being directly connectable to the carrier (124) of the second planetary gearset (PG4) and the drive output shaft (AW) solely by engagement of only the second shifting element (F), and the transmission further including either:
  a first combination in which the ring gear (131) of the first planetary gearset (PG1) is rotationally fixedly connected to the sun gear (104) of the second planetary gearset (PG4) and the sun gear (101) of the first planetary gearset (PG1) is connectable by at least the third shifting element (B, K1) to the housing (G), or
  a second combination in which the sun gear (101) of the first planetary gearset (PG1) is rotationally fixedly connected to the sun gear (104) of the second planetary gearset (PG4) and the ring gear (131) of the first planetary gearset (PG1) is connectable by at least the third shifting element (B, K1) fixed to the housing (G).

18. The motor vehicle having the transmission according to claim 17, wherein at least three of the plurality of shifting elements (E, F, B, K1) are arranged in the housing (G) so as to be accessible from the outside.

19. The motor vehicle having the transmission according to claim 17, wherein the motor vehicle is one of a passenger vehicle or a commercial vehicle.

* * * * *